United States Patent
Hirato

(10) Patent No.: US 8,421,988 B2
(45) Date of Patent: Apr. 16, 2013

(54) LIQUID CRYSTAL PANEL, MANUFACTURING METHOD OF LIQUID CRYSTAL PANEL, AND APPLICATOR

(75) Inventor: Shinichi Hirato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 396 days.

(21) Appl. No.: 12/746,798

(22) PCT Filed: Sep. 8, 2008

(86) PCT No.: PCT/JP2008/066167
§ 371 (c)(1),
(2), (4) Date: Jun. 8, 2010

(87) PCT Pub. No.: WO2009/075126
PCT Pub. Date: Jun. 18, 2009

(65) Prior Publication Data
US 2010/0271584 A1    Oct. 28, 2010

(30) Foreign Application Priority Data
Dec. 13, 2007   (JP) ................... 2007-322445

(51) Int. Cl.
*G02F 1/1339* (2006.01)
(52) U.S. Cl.
USPC .................. 349/190; 349/153; 349/154
(58) Field of Classification Search .......... 349/153, 349/154, 190
See application file for complete search history.

(56) References Cited

U.S. PATENT DOCUMENTS

| | | | |
|---|---|---|---|
| 2001/0038365 A1* | 11/2001 | Igeta | 345/60 |
| 2002/0196393 A1* | 12/2002 | Tashiro et al. | 349/106 |
| 2005/0126700 A1 | 6/2005 | Makimoto | |
| 2005/0191413 A1* | 9/2005 | Uematsu | 427/64 |
| 2005/0259215 A1* | 11/2005 | Weiner et al. | 349/187 |

FOREIGN PATENT DOCUMENTS

| | | |
|---|---|---|
| JP | 05-333351 | 12/1993 |
| JP | 06-095126 | 4/1994 |
| JP | 2004-298727 | 10/2004 |
| JP | 2005-173067 | 6/2005 |

OTHER PUBLICATIONS

International Search Report for PCT/JP2008/066167, mailed Oct. 14, 2008.

* cited by examiner

*Primary Examiner* — Jessica M Merlin
(74) *Attorney, Agent, or Firm* — Nixon & Vanderhye P.C.

(57) ABSTRACT

A liquid crystal panel 10 includes a pair of substantially rectangular substrates 17, 18 attached to each other, a liquid crystal layer 19 provided between the substrates 17, 18, and a sealant portion 20 having a substantially frame-like shape surrounding and sealing the liquid crystal layer 19. The sealant portion 20 includes an oblique portion 34 arranged oblique to the sides of the substrate 17, 18, at each of the four corners thereof. The liquid crystal panel 10 further includes a reinforcing portion 35 fixed to both substrates 17, 18. The reinforcing portion 35 is arranged along a planar direction of the substrate 17, 18 so as to be located between the oblique portion 34 and a corner point of the substrate 17, 18.

3 Claims, 29 Drawing Sheets

FIG. 1
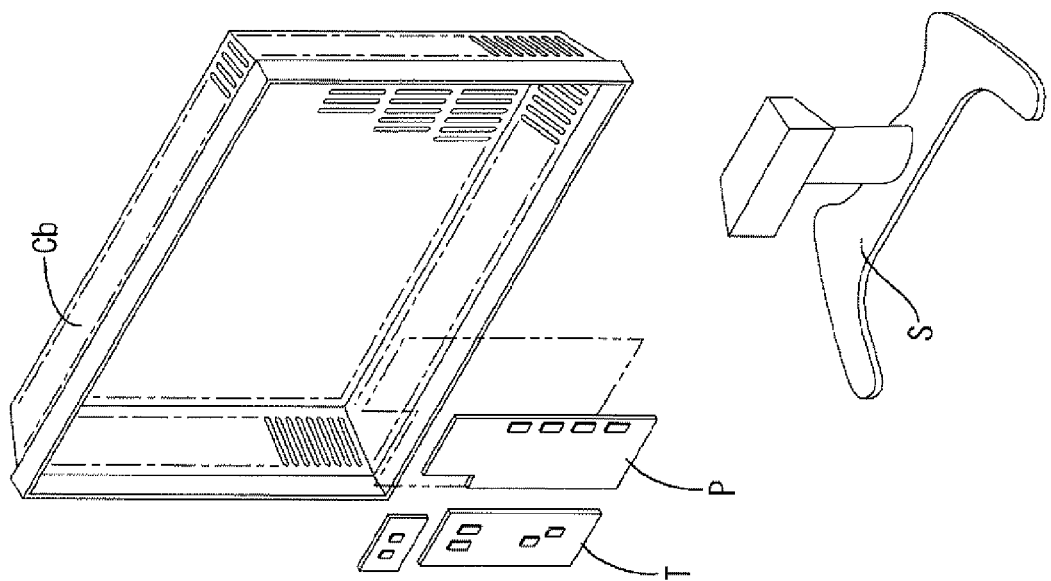
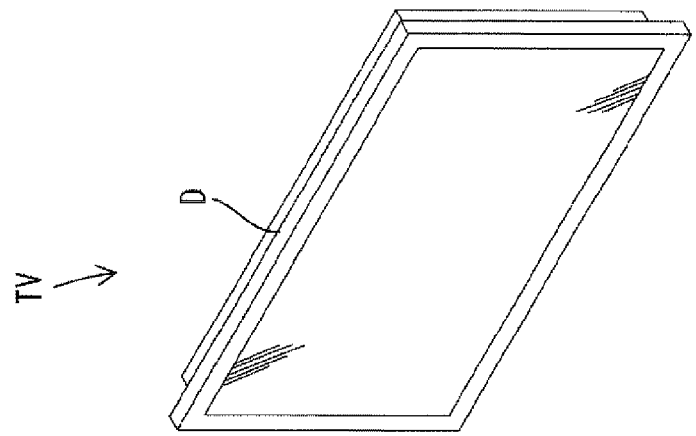
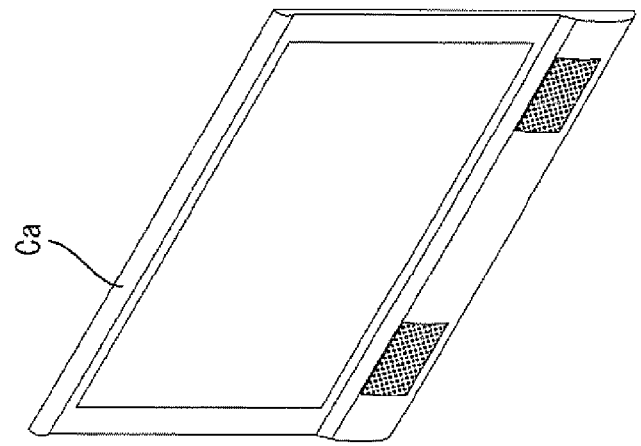

LIQUID CRYSTAL PANEL, MANUFACTURING METHOD OF LIQUID CRYSTAL PANEL, AND APPLICATOR

This application is the U.S. national phase of international Application No. PCT/JP2008/066167, filed 8 Sep. 2008, which designated the U.S. and claims priority to Japanese Application No. 2007-322445 filed 13 Dec. 2007, the entire contents of each of which are hereby incorporated by reference.

TECHNICAL FIELD

The present invention relates to a liquid crystal panel, a manufacturing method of a liquid crystal panel, and an applicator.

BACKGROUND ART

A liquid crystal panel as a major component of a liquid crystal display device is conventionally constructed as follows: A liquid crystal layer of the liquid crystal panel is provided between a pair of glass substrates, and a frame-like sealant portion for sealing the liquid crystal layer is formed to surround the liquid crystal layer.

A vacuum injection method is known as a conventional method for forming the liquid crystal layer between the substrates. According to the vacuum injection method, the substrates are attached to each other so that a sealant portion is provided therebetween. Thereafter, the sealant portion is hardened, and an inlet provided on the sealant portion is dipped in a liquid crystal material under the vacuum environment. Then, the environment is returned to the air pressure, and thereby the liquid crystal material intrudes between the substrates.

On the other hand, a one-drop-fill method described in Patent Document 1 below has recently been drawing attention as a technique adapted for the growing size of liquid crystal panels. According to the one-drop-fill method, a frame-like sealant portion is applied on one of the substrates. Thereafter, under the vacuum environment, a liquid crystal material is dropped on the substrate, and then the other substrate is attached thereto. The environment is thereafter returned to the air pressure. Thus, a liquid crystal layer is formed between the substrates. Compared to the vacuum injection method, the one-drop-fill method has the advantage of large reduction in consumption of the liquid crystal material, and further has the advantage of reduction in processing time.

Patent Document 1: JP-A-2005-173067

DISCLOSURE OF THE INVENTION

Problem to be Solved by the Invention

However, the one-drop-fill method may cause a problem as follows: During the dropping of the liquid crystal material, a number of droplets of the liquid crystal material with a predetermined distance therebetween are dropped from the nozzles of a dispensing apparatus, and are applied on one of the substrates. Thereafter, the other substrate is attached thereon, and then the applied droplets of the liquid crystal material are spread by the pressure. When the droplets of the liquid crystal material are thus spread by the pressure, the droplets in the vicinities of the corner sections of the sealant portion may fail to spread deep into the corner areas, resulting in production of vacuum bubbles, because the corner sections are formed as slightly rounded but substantially right-angled sections.

To address this problem, the inventor of the present application proposes a construction in which oblique portions, i.e., portions oblique to the sides of the substrate, are provided at the four corner sections of the sealant portion. However, the oblique portions are inevitably displaced to the inner side from the locations of the corner sections of the conventional sealant portion. That is, the oblique portions are located at a larger distance from the corner points of the substrate, compared to the conventional construction. This construction is prone to detachment or peeling of substrates, which can be caused by an impact force applied to a corner point of the substrate, for example. There is also another problem that the oblique portions are difficult to form in the case of using a conventional sealant applicator.

The present invention was made in view of the foregoing circumstances, and a primary object thereof is to provide a liquid crystal panel in which vacuum bubbles are prevented while the peel strength is improved. A secondary object is to provide an applicator adapted for application of a sealant portion having an oblique portion.

Means for Solving the Problem

A liquid crystal panel according to the present invention includes a pair of substantially rectangular substrates attached to each other, a liquid crystal layer provided between the pair of substrates, and a sealant portion having a substantially frame-like shape surrounding and sealing the liquid crystal layer. The sealant portion includes an oblique portion arranged oblique to a side of the substrate, at each of the four corners thereof. The liquid crystal panel further includes a reinforcing portion fixed to the pair of substrates. The reinforcing portion is arranged along a planar direction of the substrate so as to be located between the oblique portion and a corner point of the substrate.

According to the construction, during the formation of the liquid crystal layer between the substrates, a liquid crystal material for forming the liquid crystal layer can be spread evenly across the area within the sealant portion, because the sealant portion includes the oblique portion at each of the four corners. Consequently, vacuum bubbles can be prevented from being produced in the liquid crystal layer. Further, the substrates are resistant to detachment or peeling even when an impact force is applied to the corner point of the substrate, because the reinforcing portion is fixed to the substrates so as to be arranged along a planar direction of the substrate and be located between the oblique portion and the corner point of the substrate.

BRIEF DESCRIPTION OF THE DRAWINGS

FIG. 1 is an exploded view showing an overview of a television receiver according to an embodiment 1 of the present invention;

BEST MODE FOR CARRYING OUT THE INVENTION

Embodiment 1

An embodiment 1 according to the present invention will be explained with reference to FIGS. 1 to 14. In the present embodiment, a liquid crystal panel 11 included in a liquid crystal display device 10, and a sealant applicator 40 to be used by a manufacturing process thereof will be illustrated.

The description of the vertical direction will be made with reference to FIGS. 2, 9 and 10.

<Liquid Crystal Display Device>

Figure 2:
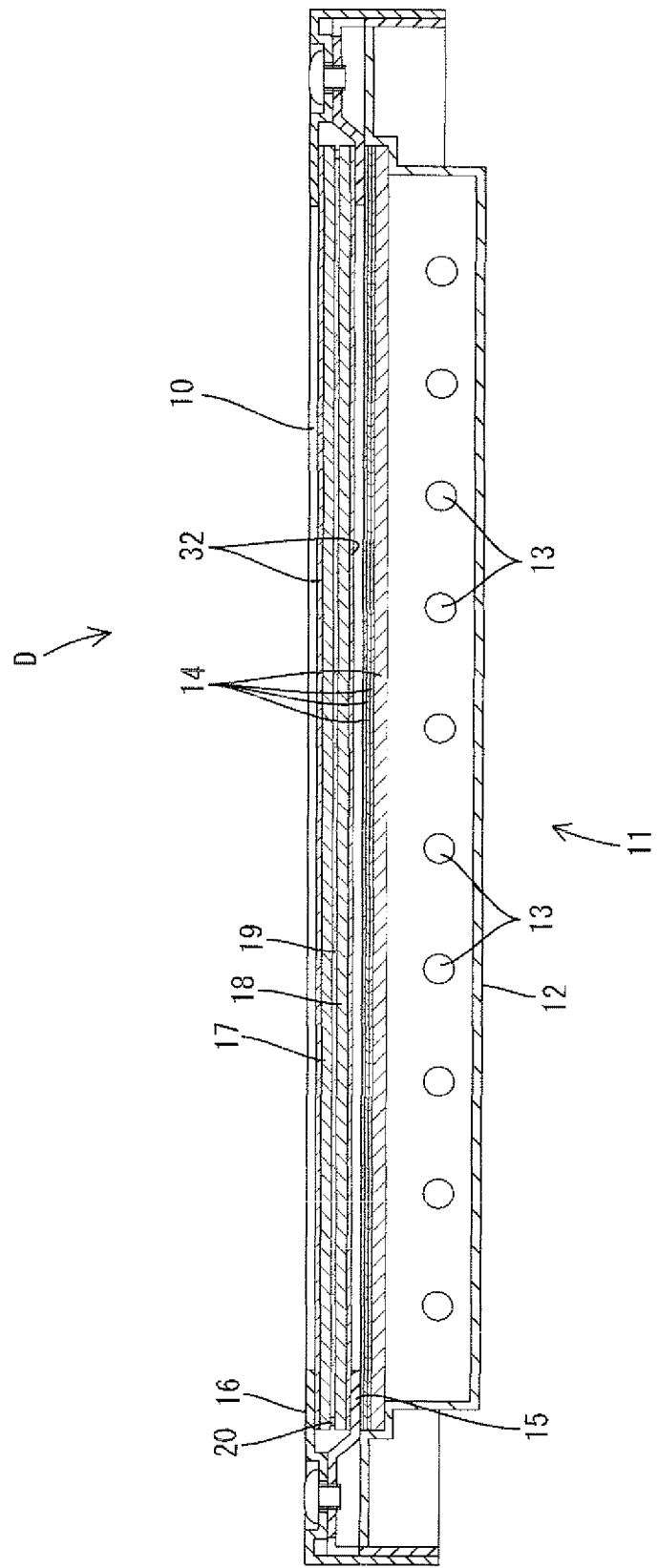
FIG. 2 is a sectional view showing an overview of a liquid crystal display device.

Referring to FIG. 2, the liquid crystal display device D forms a horizontally-long rectangular shape as a whole, which includes the liquid crystal panel 10 as a display panel capable of image display and further includes a backlight 11 that is disposed on the rear side (or back-surface side) of the liquid crystal panel 10 as an external light source (or a lighting device) capable of illuminating the liquid crystal panel 10. The liquid crystal display device D can be applied to a television receiver TV. As shown in FIG. 1, the television receiver TV includes the liquid crystal display device D, and front and back cabinets Ca and Cb capable of holding the liquid crystal display device D therebetween. Further included are a power source 2, a tuner T for broadcast reception such as TV reception, and a stand S.

<Backlight>

The backlight 11 will be briefly explained first. Referring to FIG. 2, the backlight 11 includes a casing 12 having a substantially box-like shape with a front-side (i.e., liquid crystal panel 10 side) opening, a plurality of linear light sources 13 (e.g., cold cathode tubes) arranged parallel to one another in the casing 12, a plurality of optical members 14 arranged in a stack (e.g., a diffuser plate, a diffusing sheet, a lens sheet and a brightness enhancement sheet, arranged in this order from the back side) in the opening of the casing 12, and a rectangular-shaped frame 15 for holding the optical members 14 together with the casing 12 and therebetween. The optical members 14 have functions such as a function for converting light from each linear light source 13 into flat light. The frame 15 can function also as a support member for supporting the liquid crystal panel 10 from the back side. A frame-like bezel 16 (or a holding member) is mounted on the front side of the liquid crystal panel 10, so as to bear down on the liquid crystal panel 10. The liquid crystal panel 10 is thus held between the support member and the holding member.

<Liquid Crystal Panel>

Next, the liquid crystal panel 10 will be explained in detail. The liquid crystal panel 10 includes a pair of transparent (or light transmissive) glass substrates 17, 18 having a horizontally-long rectangular shape, and further includes a liquid crystal layer 19 disposed between the substrates 17, 18. The liquid crystal layer 19 includes liquid crystal molecules as a material with an optical property that changes with applied voltage. The liquid crystal panel 10 further includes a substantially frame-like sealant portion 20 that is disposed between the substrates 17, 18 so as to surround and seal the liquid crystal layer 19. The substrates 17, 18 are attached to each other so as to face each other, while a gap (or interval) of a predetermined size is kept therebetween. A number of spacers 21 are provided to scatter in the liquid crystal layer 19, so that the gap between the substrates 17, 18 is maintained (See FIG. 4). The spacers 21 are located on the array substrate 18 so as to be above the gate wiring lines 24 and therefore at the light blocking areas. During a manufacturing process, substrates are cut out from large-size parent materials 17M, 18M called Mother Glass Substrates, and are used as the substrates 17, 18 of the liquid crystal panel 10.

Figure 3:
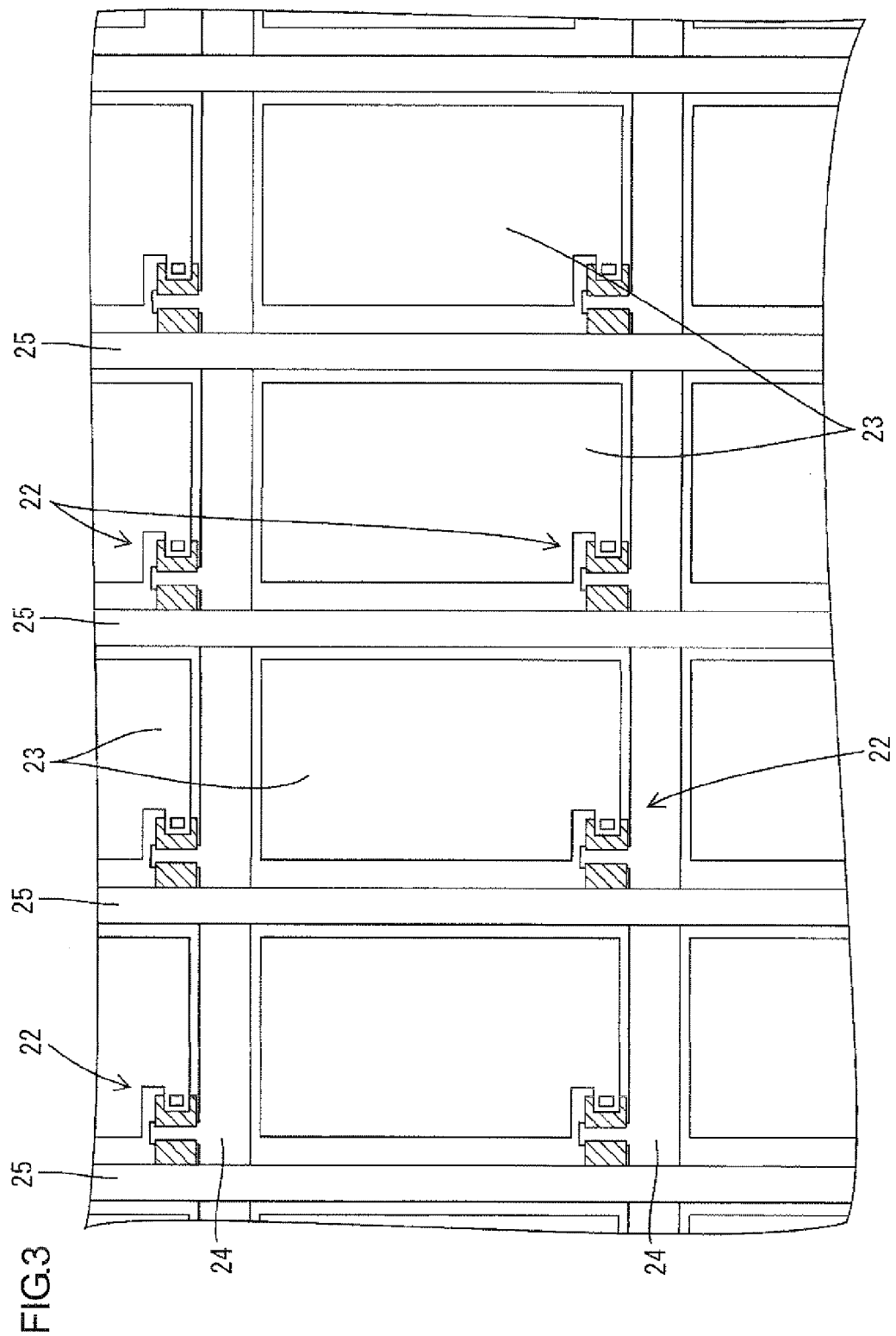
FIG. 3 is an enlarged plan view of an array substrate included in a liquid crystal panel.
Figure 4:
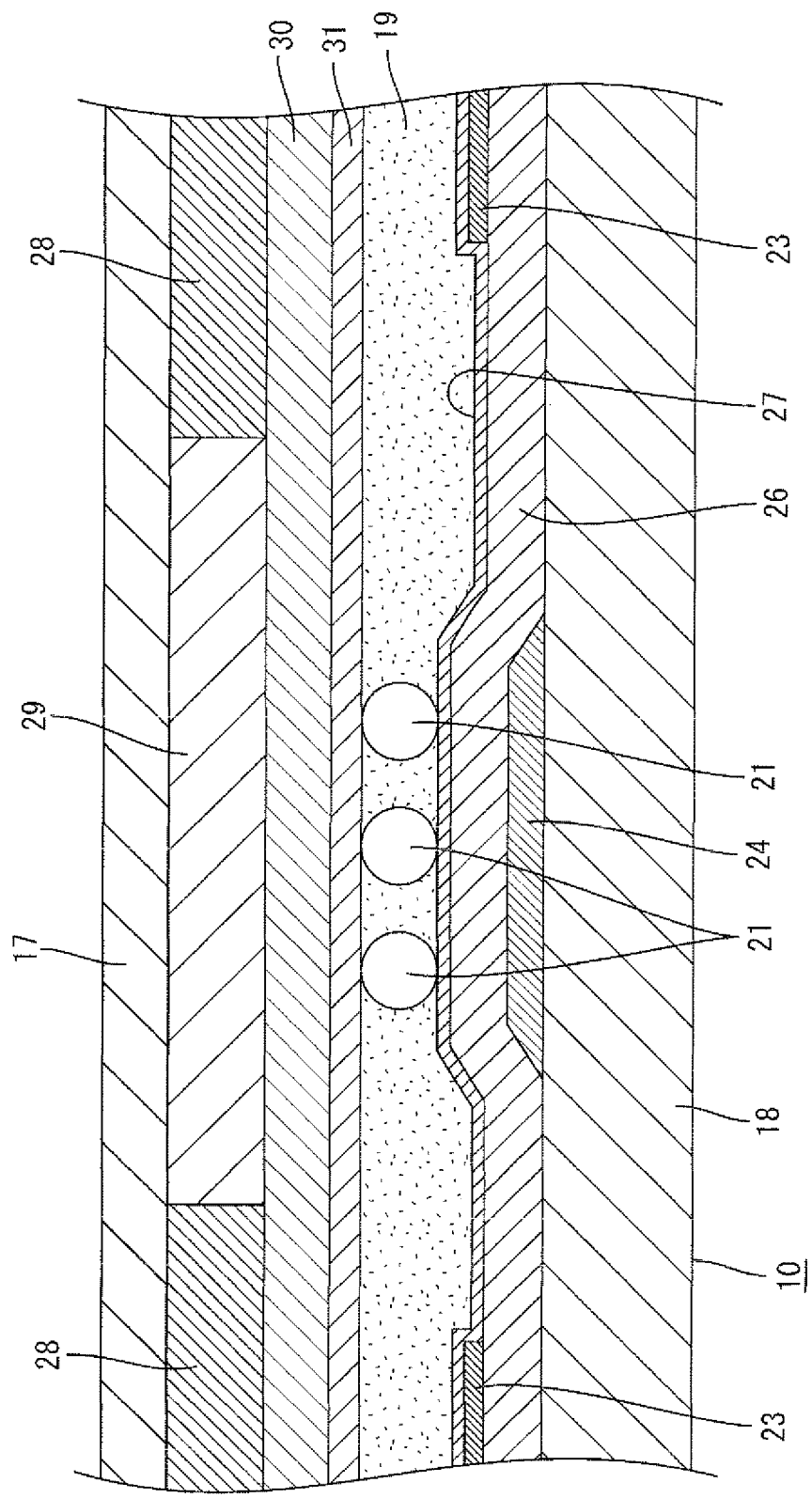
FIG. 4 is an enlarged sectional view of a part of the liquid crystal panel, which corresponds to the central area of the screen.

The front-side one (or obverse-side one) of the substrates 17, 18 is provided as a CF substrate 17, while the back-side one (or reverse-side one) is provided as an array substrate 18. On the inner surface side (i.e., liquid crystal layer 19 side or CF substrate 17 facing surface side) of the array substrate 18, as shown in FIG. 3, a number of TFTs 22 (Thin Film Transistors) as switching elements and pixel electrodes 23 are arranged, and further gate wiring lines 24 and source wiring lines 25 are arranged in a grid pattern so as to surround the TFTs 22 and the pixel electrodes 23. The pixel electrode 23 is connected to the drain electrode of the TFT 22. The source wiring line 25 is connected to the source electrode of the TFT 22, while the gate wiring line 24 is connected to the gate electrode of the TFT 22. Each pixel electrode 23 is formed of a transparent electrode, e.g., made of ITO (Indium Tin Oxide) or ZnO (Zinc Oxide). As shown in FIG. 4, an insulating layer 26 is provided on the surfaces of the array substrate 18 and the gate wiring lines 24. The pixel electrodes 23 are provided on the surface of the insulating layer 26. Further, an alignment film 27 for orientational alignment of the liquid crystal molecules included in the liquid crystal layer 19 is provided on the surfaces of the pixel electrodes 23 and the insulating layer 26.

Figure 5:
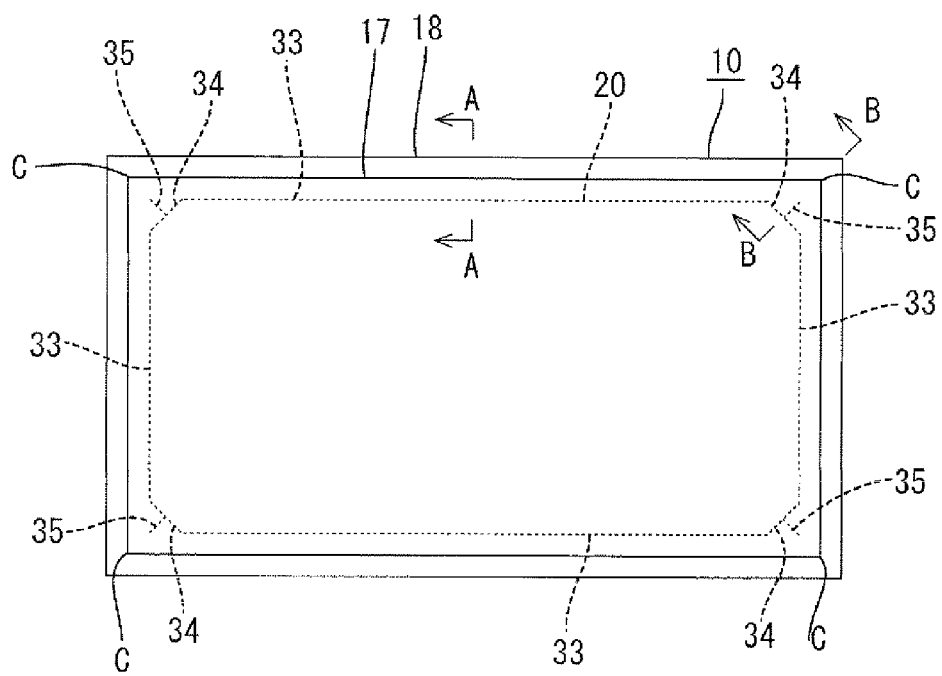
FIG. 5 is a plan view of the liquid crystal panel.

On the other hand, as shown in FIG. 4, a number of colored films 28 constituting a color filter are arranged on the CF substrate 17 so as to correspond to the respective pixels. The color filter includes colored films 28 of three colors, i.e., R, G and B films, which are arranged in cyclic order. A light blocking layer 29 (black matrix) for preventing color mixture is provided between the colored films 28 of the color filter. A counter electrode 30 is provided on the surfaces of the colored films 28 and the light blocking layer 29, so as to be opposite to the pixel electrodes 23 provided on the array substrate 18 side. An alignment film 31 for orientational alignment of the liquid crystal molecules included in the liquid crystal layer 19 is provided on the surface of the counter electrode 30. Referring to FIG. 5, the CF substrate 17 is slightly smaller than the array substrate 18. Therefore, the peripheral edge of the CF substrate 17 is located to recede to the inner side from the peripheral edge of the array substrate 18. As shown in FIG. 2, a pair of front and back polarizing plates 32 are attached on the outer surface sides of the respective substrates 17, 18.

<Details of Sealant Portion>

Figure 6:
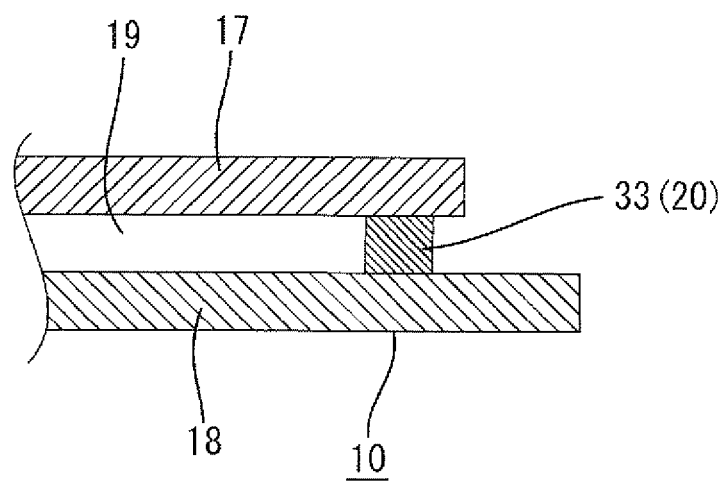
FIG. 6 is a sectional view of FIG. 5 along the line A-A.

Next, the sealant portion 20 will be explained in detail. The sealant portion 20 is formed of a resin material, such as an ultraviolet curable resin material that can be hardened by ultraviolet irradiation, or a UV/heat dual-curable resin material that can be hardened by ultraviolet irradiation and thereafter can improve in cure degree or adhesion strength when the heat is applied thereto. Referring to FIGS. 5 and 6, the sealant portion 20 has a substantially quadrangular frame-like shape when viewed planarly, which is arranged to surround the inner space to be filled with the liquid crystal layer 19. The sealant portion 20 includes four straight portions 33 extending substantially straightforward along the respective sides of the substrates 17, 18, and further includes four oblique portions 34 at the four corner sections. The oblique portions 34 are arranged oblique to the sides of the substrates 17, 18, so as to be connected between the straight portions 33.

The straight portions 33 are located to be displaced to the inner side from the peripheral edge of the CF substrate 17, so that a marginal area having a constant width and extending substantially straightforward is provided between the outer edge of each straight portion 33 and the peripheral edge of the CF substrate 17. The straight portions 33 include two straight portions along the long sides of the rectangular substrates 17, 18, and further includes two straight portions along the short sides. On the other hand, each oblique portion 34 is connected between the end of the straight portion 33 along the long side and the end of the straight portion 33 along the short side. The oblique portion 34 is arranged oblique to the both straight portions 33, and extends straightforward. The distance between the oblique portion 34 and the peripheral edge of the CF substrate 17 gradually increases toward the corner point (i.e., the vertex "C"). The inclination of the oblique portion 34 from the straight portions 33 is set to 45 degrees. That is, the inner surface of the oblique portion 34, facing the liquid crystal layer 19, forms an angle of approximately 135 degrees (i.e., an obtuse angle) with the inner surface of each straight portion 33. Accordingly, the area between the oblique portion 34 and the corner point of the OF substrate 17 (i.e., the corner area of the CF substrate 17 bounded by its peripheral edge) has a substantially isosceles triangular shape, when viewed planarly. The straight portions 33 and the oblique portions 34 have a substantially constant width along the entire length.

<Reinforcing Portion>

Figure 7:
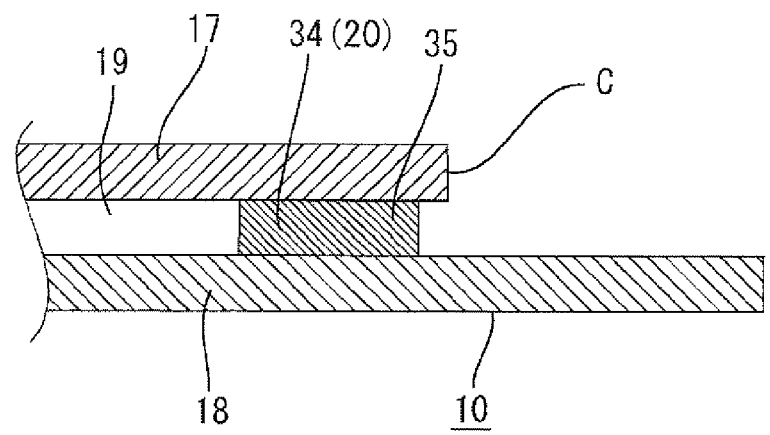
FIG. 7 is a sectional view of FIG. 5 along the line B-B.

Referring to FIGS. 5 and 7, reinforcing portions 35 are provided to be fixed to the both substrates 17, 18. Each reinforcing portion 35 is arranged along a planar direction of the substrate 17, 18 so as to be located between a corner point of the substrates 17, 18 and the oblique portion 34 of the sealant portion 20 described above. The reinforcing portions 35 are formed of the same resin material as the sealant portions 20, by the same process of the manufacturing process as the sealant portion 20, as described below. Each reinforcing portion 35 substantially linearly extends from the middle section of the length of the oblique portion 34 toward the corner point C of the CF substrate 17, so as to form a substantially straight line connected to the oblique portion 34. The reinforcing portion 35 forms substantially a right angle with the oblique portion 34, and has a constant with along the entire length. The distance between the distal end of the reinforcing portion 35 and the corner point C of the CF substrate 17 is set to be substantially equal to the width of the marginal area between the outer edge of the straight portion 33 and the peripheral edge of the CF substrate 17. According to the construction, the peel strength, i.e., the strength against a force to detach the substrates 17, 18, is uniformly provided over the entire circumference of the liquid crystal panel 10, so that the liquid crystal panel 10 is prevented from locally including a low-strength area on the circumference. Thus, due to the reinforcing portions 35 provided on the corner areas of the substrates 17, 18, the corner areas can have the same level of peel strength as the other areas, although the distance between the oblique portions 34 and the corner points of the substrates 17, 18 is larger than the distance between the straight portions 33 and the substrates 17, 18.

<Overview of Manufacturing Method of Liquid Crystal Panel>

The liquid crystal panel 10 having the above construction can be manufactured from large-size parent materials 17M, 18M called Mother Glass Substrate (See FIG. 8), as described above. A brief explanation is as follows: The manufacture of the liquid crystal panel 10 includes a CF substrate treatment process for forming components of CF substrates 17 on a surface of the parent material 17M for the CF substrates, and an array substrate treatment process for forming components of array substrates 18 on a surface of the parent material 18M for the array substrates. Further included are a panel assembly process for attaching the completed parent materials 17M, 18M to each other while providing a liquid crystal layer 19 between the parent materials 17M, 18M, and a cutting process for cutting out liquid crystal panels 10 from the parent materials 17M, 18M. The parent materials 17M, 18M can include a plurality of liquid crystal panels 10 arranged in an array of rows and columns with a predetermined distance therebetween (e.g., a total of nine panels arranged in an array of three rows and three columns, as in FIG. 8).

The panel assembly process includes processes to be sequentially performed, which include a sealant portion application process for applying a resin material to one of the parent materials 17M, 18M (e.g., the CF substrates' parent material 17M, in the present embodiment) so as to form sealant portions 20 at the areas saved for the sealant portions, and a reinforcing portion application process for applying the resin material to the CF substrates' parent material 17M, i.e., to the parent material to be subjected to the application of the sealant portion 20, so as to form reinforcing portions 35 at the areas saved for the reinforcing portions. Further included are a liquid crystal dropping process for dropping a liquid crystal material on the area provided on the inner side of each sealant portion 20 on the CF substrates' parent material 17M, and an attachment process for attaching the parent materials 17M, 18M to each other while hardening and fixing the sealant portions 20 and the reinforcing portions 35 by the light irradiation using an exposure device (not shown) and/or by the application of heat. The applicator 40 to be used by the sealant application process and the reinforcing portion application process will be explained in detail, next.

<Applicator>

Figure 8:
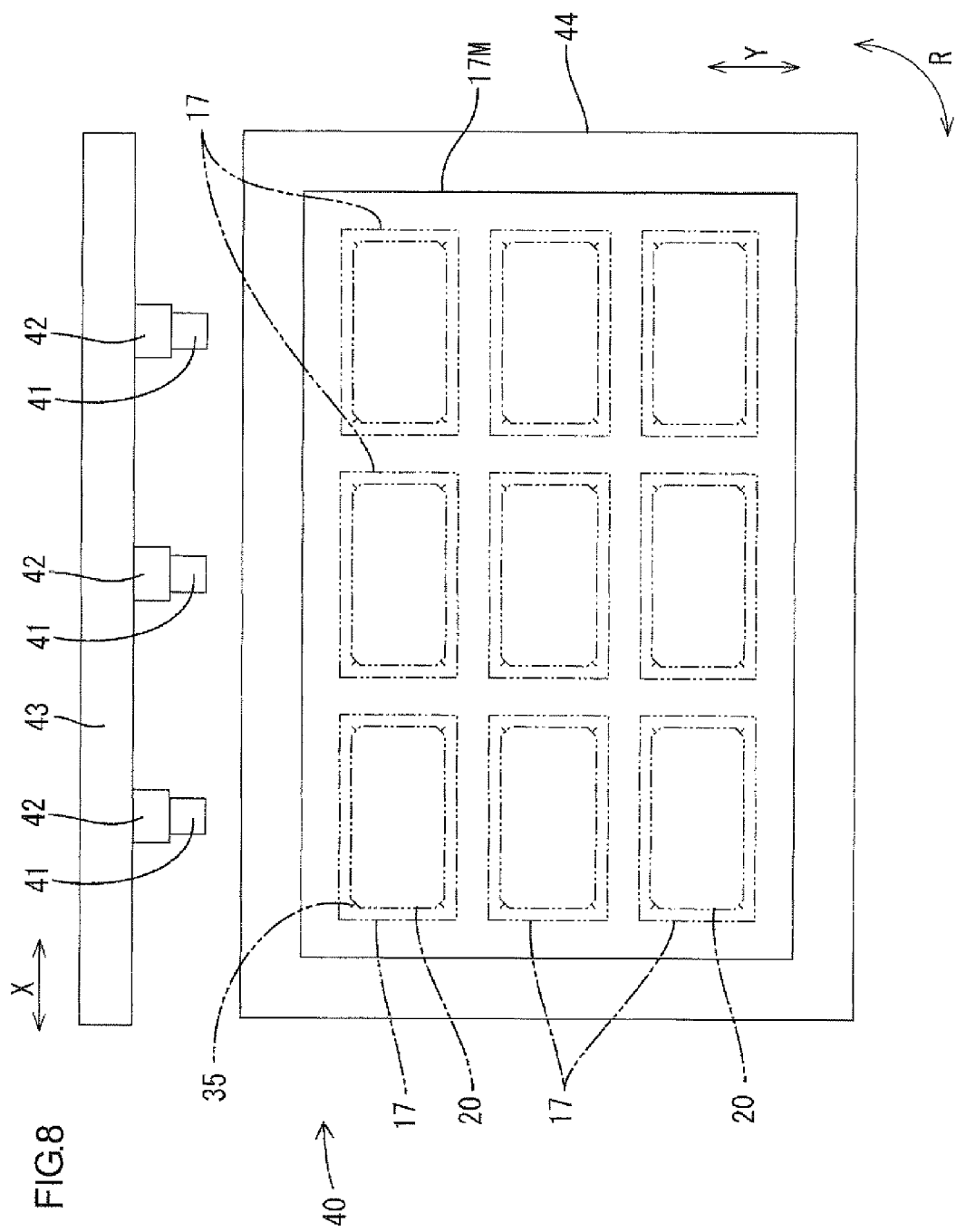
FIG. 8 is a plan view of an applicator.
Figure 9:
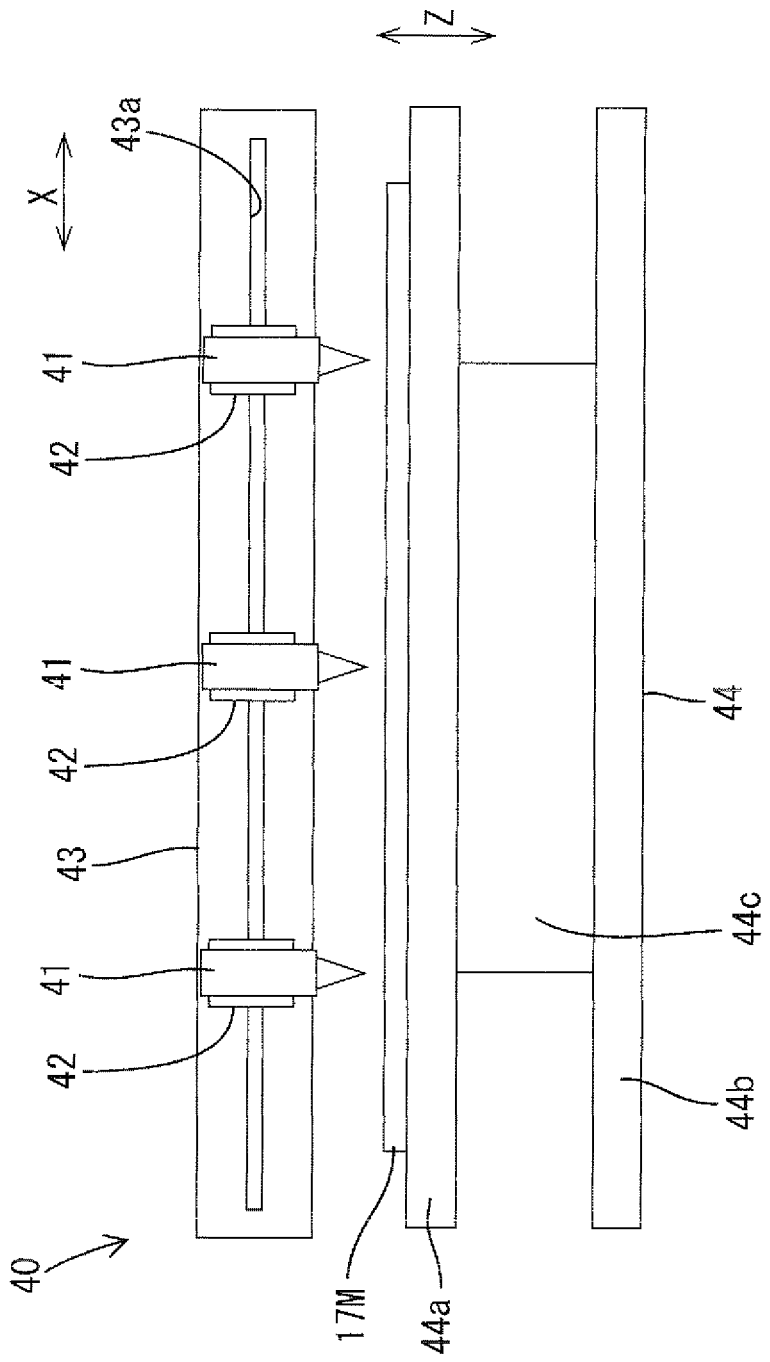
FIG. 9 is a front view of the applicator.
Figure 10:
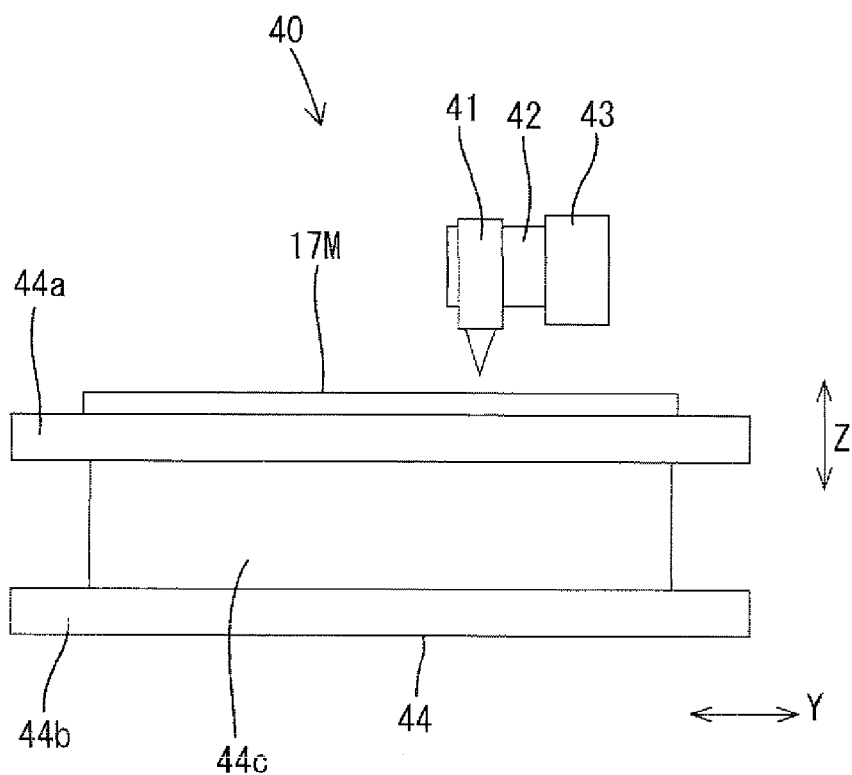
FIG. 10 is a side view of the applicator.

Referring to FIGS. 8 to 10, the applicator 40 includes nozzles 41 capable of ejecting a resin material in softened state, and dispenser bodies 42 for supporting the nozzles 41 to be movable in the vertical direction (i.e., the direction approaching to and receding from the CF substrates' parent material 17M, or the direction Z shown in FIGS. 9 and 10). Further included are a guide 43 for supporting the dispenser bodies 42 to be linearly slidable in the horizontal direction (i.e., along a planar direction of the CF substrates' parent material 17M), and a stage 44 capable of horizontal rotation and movement in a direction perpendicular to the sliding direction of the dispenser bodies 42 on the guide 43. The stage 44 is provided as a rest on which the CF substrates' parent material 17M (i.e., the substrate to be subjected to the application) is placed.

Each nozzle 41 has a tapered shape, and an ejection aperture for ejecting a resin material is formed on the end portion thereof. The dispenser body 42 is connected with the nozzle 41 and also with a tank containing the resin material. The resin material can be supplied from the tank by a pump (although both of the tank and the pump are not shown). The guide 43 has a linear shape, and the length thereof is set to be slightly larger than the diagonal dimension of the CF substrates' parent material 17M. A slide groove 43a is provided on the side surface of the guide 43 so as to be along the length direction of the guide 43 (i.e., the direction X shown in FIGS. 8 and 9). The dispenser bodies 42 are mounted to the slide groove 43a so as to be slidable (or movable) along the slide groove 43a. In the present embodiment, three dispenser bodies 42 having respective nozzles 41 are mounted on the guide 43. The stage 44 includes a substrate rest 44a, a support base 44b for supporting the substrate rest 44a, and a rotating shaft 44c arranged between the substrate rest 44a and the support base 44b. The CF substrates' parent material 17M is directly placed on the substrate rest 44a. On the support base 44b, the substrate rest 44a can rotate around the rotating shaft 44c and in the direction R shown in FIG. 8. The support base 44b, together with the rotating shaft 44c and the substrate rest 44a, can move in a direction perpendicular to the extending direction of the guide 43 (i.e., the direction Y shown in FIGS. 8 and 10). The substrate rest 44a has a substantially rectangular shape when viewed planarly, so as to fit with the CF substrates' parent material 17M.

<Sealant Application Process and Reinforcing Portion Application Process>

Figure 11:
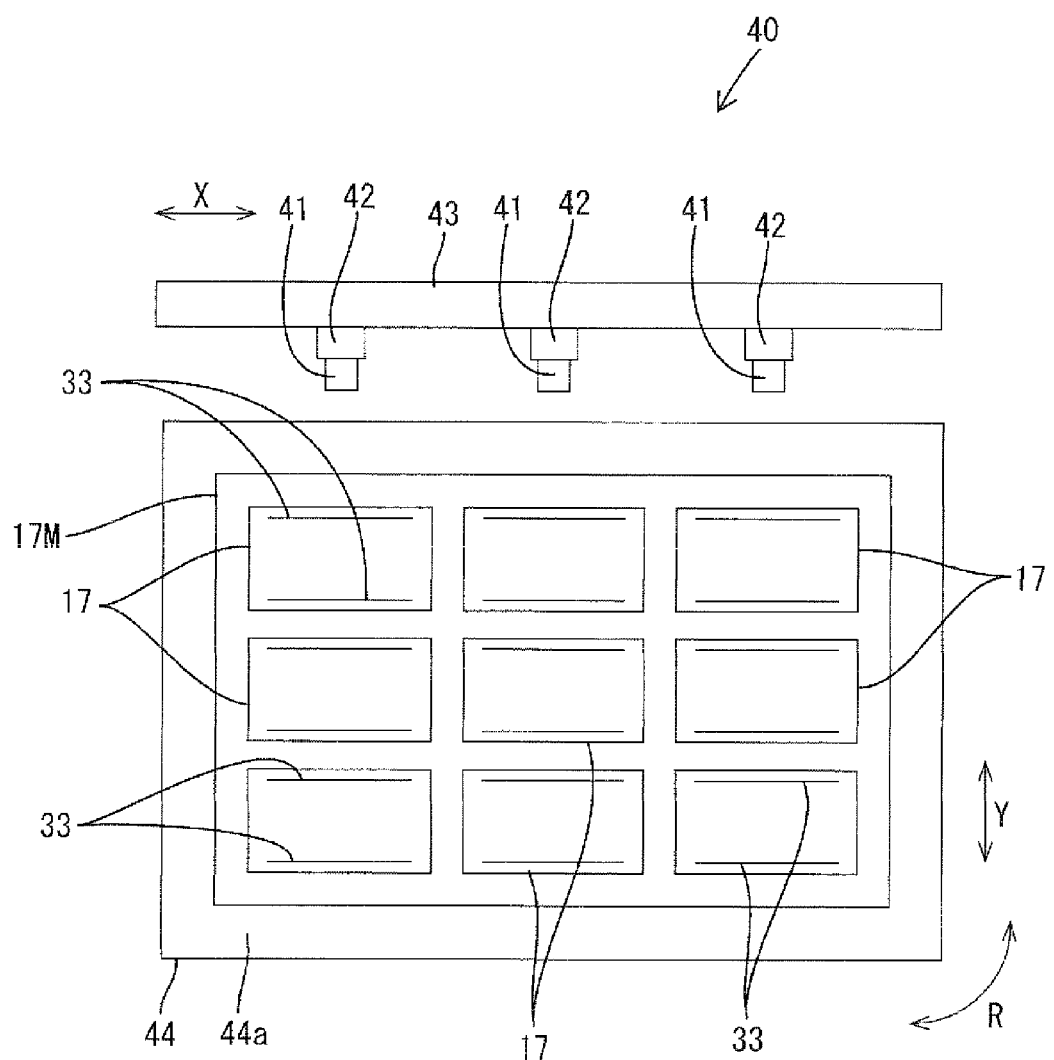
FIG. 11 is a plan view showing when application of straight portions along the long sides is completed by a sealant application process.

In the present embodiment, the sealant application process and the reinforcing portion application process are consecutively performed using the same applicator 40. The detailed operating procedure is as follows: The CF substrates' parent material 17N is set on the substrate rest 44a of the stage 44, while the substrate rest 44a is maintained on the stage 44 so that the long side thereof is parallel to the length direction of the guide 43. Then, in order to horizontally position the nozzles 41 at the initial positions relative to the CR substrates' parent material 17M, the support base 44b is moved in the direction Y shown in FIG. 11 while the dispenser bodies 42 are moved on the guide 43 in the direction X shown in FIG. 11. Thereafter, the nozzles 41 are moved down so as to approach the surface of the CF substrates' parent material 17M, and the resin material is ejected from the ejection apertures while the dispenser bodies 42 are moved on the guide 43 in the direction X. Thereby, the straight portions 33 of sealant portions 20 along the long side are applied. After the application, the nozzles 41 are once moved up, and the stage 44 is moved so that the nozzles 41 are positioned at the next application positions. Then, the nozzles 41 are again moved down, and the resin material is ejected while the dispenser bodies 42 are moved. Thereby, the straight portions 33 along the long side are applied in the next row. In this way, the sealant portions 20 of three CF substrates 17 arranged along the long side of the CF substrates' parent material 17M can be treated parallel and simultaneously by the simultaneous operations of the three nozzles 41. The above operations are repeated, and consequently the straight portions 33 of sealant portions 20 along the long sides of the CF substrates 17 are applied as shown in FIG. 11.

Figure 12:
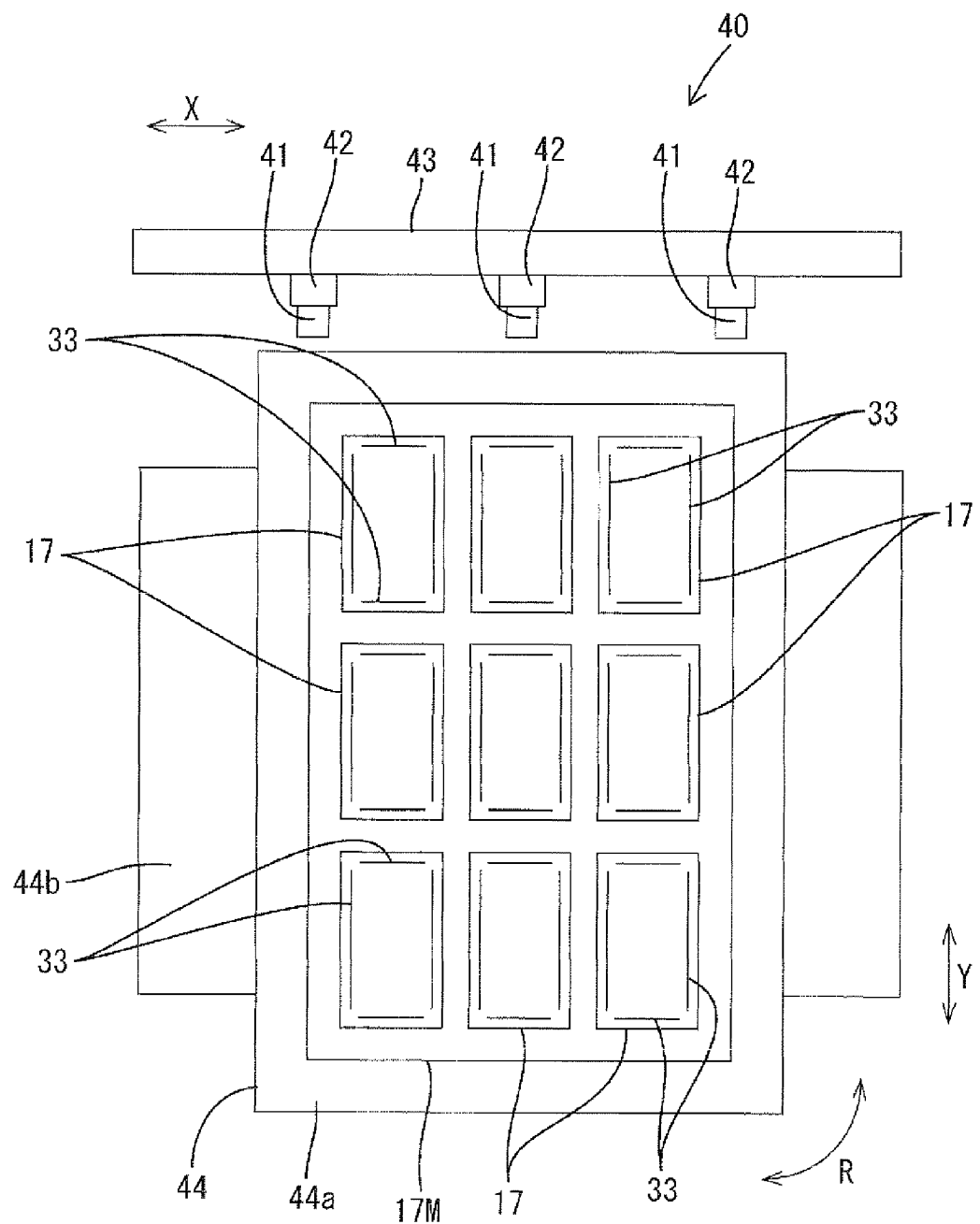
FIG. 12 is a plan view showing when application of straight portions along the short sides is completed by the sealant application process.

When the application of all straight portions 33 along the long sides is completed, referring to FIG. 12, the substrate rest 44a on the stage 44 is rotated substantially 90 degrees with respect to the support base 44b and in the direction R shown in the figure. Thereby, the short side of the substrate rest 44a (or the CF substrates' parent material 17M) on the stage 44 is arranged parallel to the length direction of the guide 43. Then, the nozzles 41 are positioned by the individual movement of the stage 44 and the dispenser bodies 42. Thereafter, the resin material is ejected from the nozzles 41 while the dispenser bodies 42 are moved along the guide 43, in a similar manner to the above operation. Thereby, the straight portions 33 of the sealant portions 20 along the short side are applied. The operations are repeated as in the case of those along the long sides, and consequently the straight portions 33 of the sealant portions 20 along the short sides of the CF substrates 17 are applied.

Figure 13:
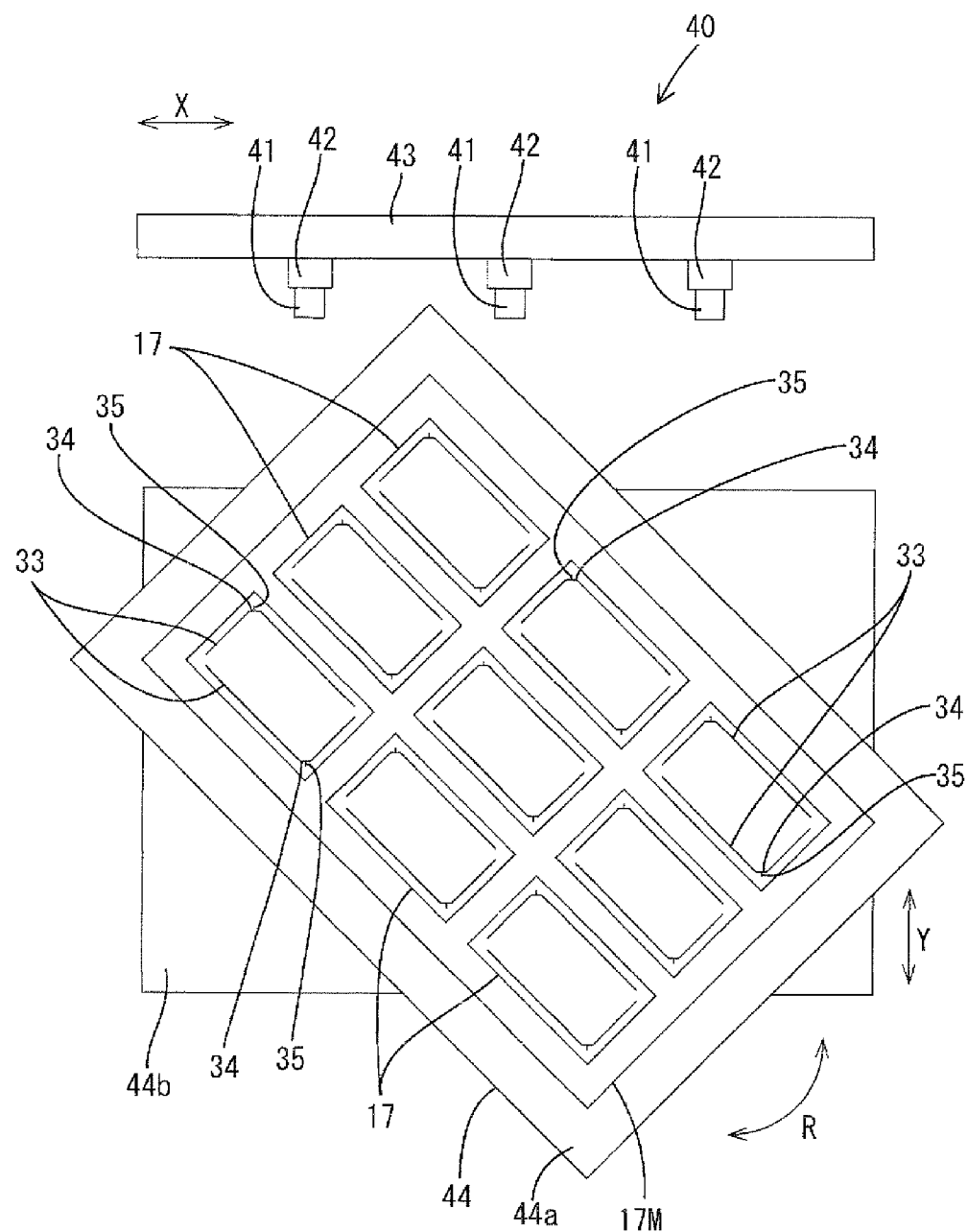
FIG. 13 is a plan view showing when application of two oblique portions located at corners opposed to each other is completed by the sealant application process.
Figure 14:
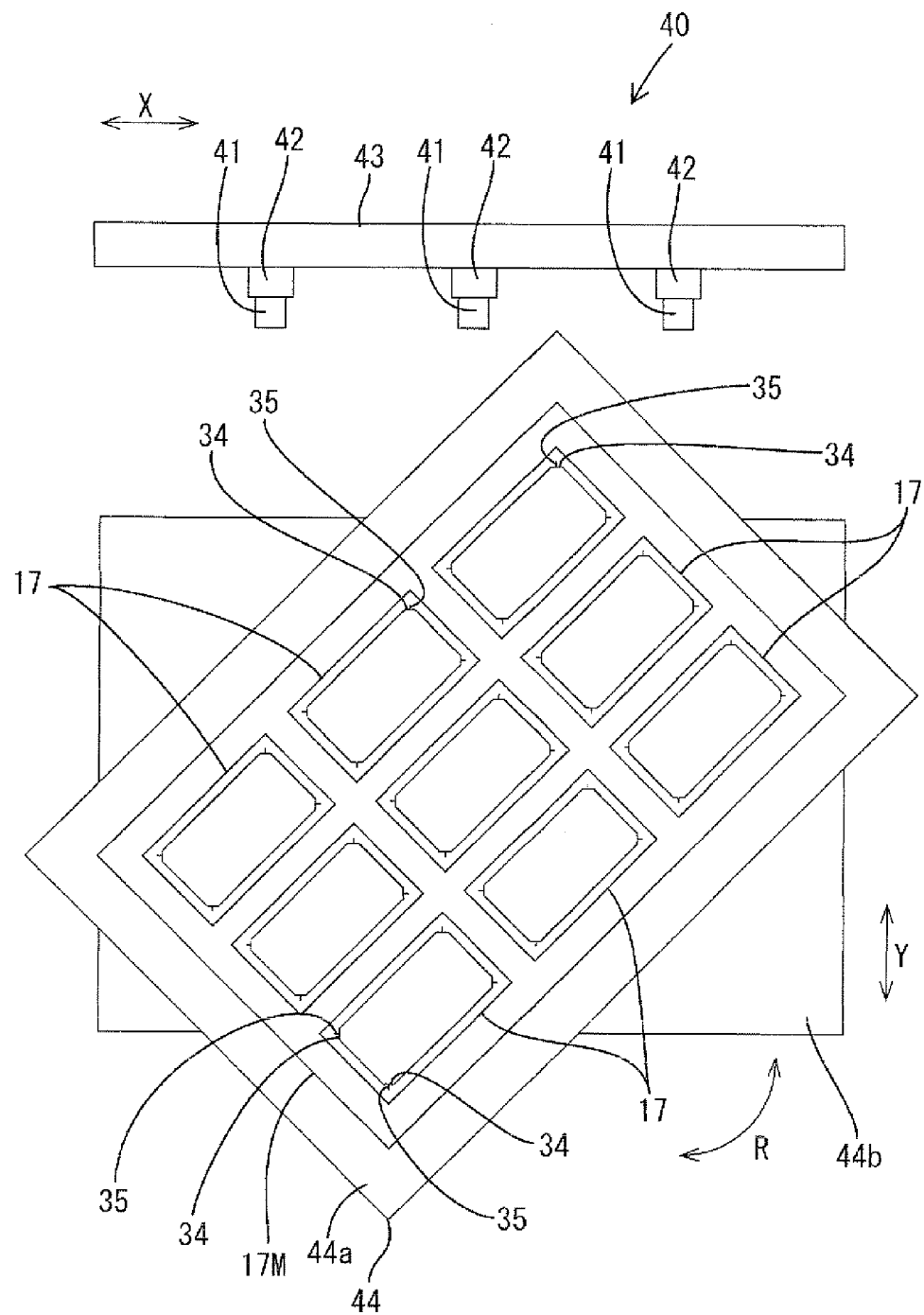
FIG. 14 is a plan view showing when application of the other oblique portions is completed by the sealant application process.

When the application of all straight potions 33 along the short sides is completed, the substrate rest 44a on the stage 44 is rotated substantially 45 degrees with respect to the support base 44b, as shown in FIG. 13. The nozzles 41 are positioned by the movement of the stage 44 and the dispenser bodies 42, and then the resin material is ejected from the nozzles 41 while the dispenser bodies 42 are moved along the guide 43, in a similar manner to the above operation. Thereby, two oblique portions 34 of the sealant portion 20, parallel to the length direction of the guide 43, are sequentially applied on each CF substrate 17 so as to be located at corners opposed to each other. Specifically, the oblique portions 34 are first applied on the CF substrate 17 located at the corner area of the CF substrates' parent material 17M closest to the guide 43, by use of the middle nozzle 41 of the three nozzles 41, for example. Next, by use of two nozzles 41, the oblique portions 34 are simultaneously applied on two CF substrates 17, which are arranged adjacent to the corner CF substrate 17 described above along the direction parallel to the length direction of the guide 43. Thereafter, by use of the three nozzles 41, the oblique portions 34 are simultaneously applied on three CF substrates 17, which are arranged adjacent to the two CF substrates 17 described above along the direction parallel to the length direction of the guide 43. In this way, the application of the oblique portions 34 on CF substrates 17 arranged in the direction parallel to the length direction of the guide 43 is sequentially performed. Next, the substrate rest 44a on the stage 44 is rotated substantially 90 degrees with respect to the support base 44b, as shown in FIG. 14. Then, the other oblique portions 34, parallel to the length direction of the guide 43, are sequentially applied in a similar manner to the above operations.

In the above application process, the application of the reinforcing portions 35 is performed simultaneously with the application of the oblique portions 34. Specifically, during the application of each oblique portion 34, the dispenser body 42 sliding along the guide 43 is stopped when the nozzle 41 has reached the middle point on the length of the oblique portion 34. Then, the stage 44 is moved in the direction Y shown in FIGS. 13 and 14 while the resin material is ejected from the nozzle 41. Thereby, the reinforcing portion 35 is applied so as to form a linear shape extending in the direction perpendicular to the extending direction of the oblique portion 34. At the time, the resin material is continuously ejected during the movement of the nozzle 41 from the oblique portion 34 to the reinforcing portion 35, and thereby the reinforcing portion 35 can be formed to be connected to the oblique portion 34. Alternatively, the nozzle 41 may be once moved up after the application of the entire length of the oblique portion 34, and then the reinforcing portion 35 can be applied anew.

<Liquid Crystal Dropping Process and Attachment Process>

In the liquid crystal dropping process, a number of droplets of a liquid crystal material with a predetermined distance therebetween are dropped on the CF substrates' parent material 17M that has undergone the sealant application process and the reinforcing portion application process as described above. Thereafter, the array substrates' parent material 18M is attached thereto. At the time, the droplets of the liquid crystal material are spread by the pressure from the parent materials 17M, 18M, so as to permeate the entire area that is provided between the parent materials 17M, 18M and is surrounded by the sealant portion 20. Note that the sealant portion 20 includes the oblique portions 34 at the four corner sections. In contrast to the conventional right-angled corner sections of a sealant portion, the oblique portions 34 of the present embodiment are located on the substrates 17, 18 so as to recede to the inner side, i.e., be closer to the periphery of the applied droplet of the liquid crystal material. Therefore, the droplets of the liquid crystal material can be evenly spread by the pressure, so as to reach into the corner area provided on the inner side of each oblique portion 34. Consequently, the production of vacuum bubbles can be prevented. After the above attachment, the light from an exposure device and/or the heat is applied to the sealant portions 20 and the reinforcing portions 35, so that they are hardened and fixed to the parent materials 17M, 18M. Thereafter, liquid crystal panels 10 are cut out from the parent materials 17M, 18M, by the cutting process.

As explained above, the liquid crystal panel 10 according to the present embodiment includes a pair of substantially rectangular substrates 17, 18 attached to each other, a liquid crystal layer 19 provided between the substrates 17, 18, a sealant portion 20 having a substantially frame-like shape surrounding and sealing the liquid crystal layer 19, and a reinforcing portion 35 fixed to the substrates 17, 18. The sealant portion 20 includes an oblique portion 34 arranged oblique to the sides of the substrate 17, 18, at each of the four corners thereof. The reinforcing portion 35 is arranged along a planar direction of the substrate 17, 18 so as to be located between the oblique portion 34 and a corner point of the substrate 17, 18.

According to the construction, during the formation of the liquid crystal layer 19 between the substrates 17, 18, a liquid crystal material for forming the liquid crystal layer 19 can be spread evenly across the area within the sealant portion 20, because the sealant portion 20 includes the oblique portion 34 at each of the four corners. Consequently, vacuum bubbles can be prevented from being produced in the liquid crystal layer 19. Further, the substrates 17, 18 are resistant to detachment even when an impact force is applied to the corner point of the substrate 17, 18, because the reinforcing portion 35 is fixed to the substrates 17, 18 so as to be arranged along a planar direction of the substrate 17, 18 and be located between the oblique portion 34 and the corner point of the substrate 17, 18. Thus, the vacuum bubbles are prevented while the peel strength is improved.

Further, the reinforcing portion 35 is connected to the sealant portion 20. Thereby, the peel strength of the substrates 17, 18 can be further improved. Moreover, the reinforcing portion 35 has a linear shape extending in the direction intersecting with the oblique portion 34. Accordingly, the peel strength of the substrates 17, 18 can be further improved.

According to the present embodiment, the manufacturing method of a liquid crystal panel 10 includes a sealant portion application process for applying a sealant portion 20 having a substantially frame-like shape to the CF substrate 17, i.e., one of the pair of substantially rectangular substrates 17, 18. The sealant portion 20 includes an oblique portion 34 arranged oblique to the sides of the substrate 17, 18, at each of the four corners thereof. The manufacturing method further includes a reinforcing portion application process for applying a reinforcing portion 35 to the CF substrate 17, i.e., one of the substrates 17, 18. The reinforcing portion 35 is arranged along a planar direction of the CF substrate 17 so as to be located between the oblique portion 34 and a corner point of the substrate 17, 18. The manufacturing method further includes a liquid crystal dropping process for dropping a liquid crystal material on the CF substrate 17 having the sealant portion 20 applied thereon, and an attachment process for attaching the substrates 17, 18 to each other and fixing the sealant portion and the reinforcing portion 35 to the substrates 17, 18. According to the method, the operational effects similar to those of the liquid crystal panel 10 described above can be achieved.

In the sealant portion application process and the reinforcing portion application process, the application of the sealant portion 20 and the application of the reinforcing portion 35 are consecutively performed for the same CF substrate 17 using the same applicator 40. According to the method, the applicator cost can be reduced, compared to a case where the application of a sealant portion and the application of a reinforcing portion are performed for different substrates using different applicators. Further, the processing time can be shortened due to the consecutive application of the sealant portion 20 and the reinforcing portion 35.

The present embodiment further provides the applicator 40 to be used for the application of the sealant portion 20 on the CF substrate 17, i.e., one of the pair of substantially rectangular substrates 17, 18. The sealant portion 20 has a substantially frame-like shape, and includes an oblique portion 34 arranged oblique to the sides of the substrate 17, 18, at each of the four corners thereof. The applicator 40 includes a nozzle 41 capable of ejecting a sealant material onto the CF substrate 17, a dispenser body 42 arranged to support the nozzle 41 to be movable in the direction approaching to and receding from the CF substrate 17, a guide 43 arranged to support the dispenser body 42 to be linearly slidable along a planar direction of the CF substrate 17, and a stage 44 provided as a rest for the CF substrate 17. The stage 44 is rotatable in a planar direction of the CF substrate 17, and is movable in a direction perpendicular to the sliding direction of the dispenser body 42 on the guide 43.

According to the construction, the nozzle 41 can be positioned with respect to the CF substrate 17 by the movement of the stage 44 in the direction perpendicular to the sliding direction of the dispenser body 42 on the guide 43 and by the rotation of the stage 44 in the planar direction of the CF substrate 17. Thereafter, the sealant material is ejected from the nozzle 41 while the dispenser body 42 is slid on the guide 43. Thereby, the sealant portion 20 can be applied to the CF substrate 17. At the time, the formation of the oblique portion 34 oblique to the sides of the substrate 17, 18 can be readily achieved if the angle of the above rotation of the stage 44 is adjusted therefor.

Embodiment 2

An embodiment 2 of the present invention will be explained with reference to FIGS. 15 to 22. The present embodiment 2 shows a modification that includes an applicator 40A dedicated for the application of the sealant portion 20. In the present embodiment 2, the parts called by the same names as those of the above embodiment 1 are designated by the same symbols, even if they differ in construction. However, the suffix "A" is attached to the symbols. The redundant explanations for the constructions and operational effects will be omitted.

<Applicator>

Figure 15:
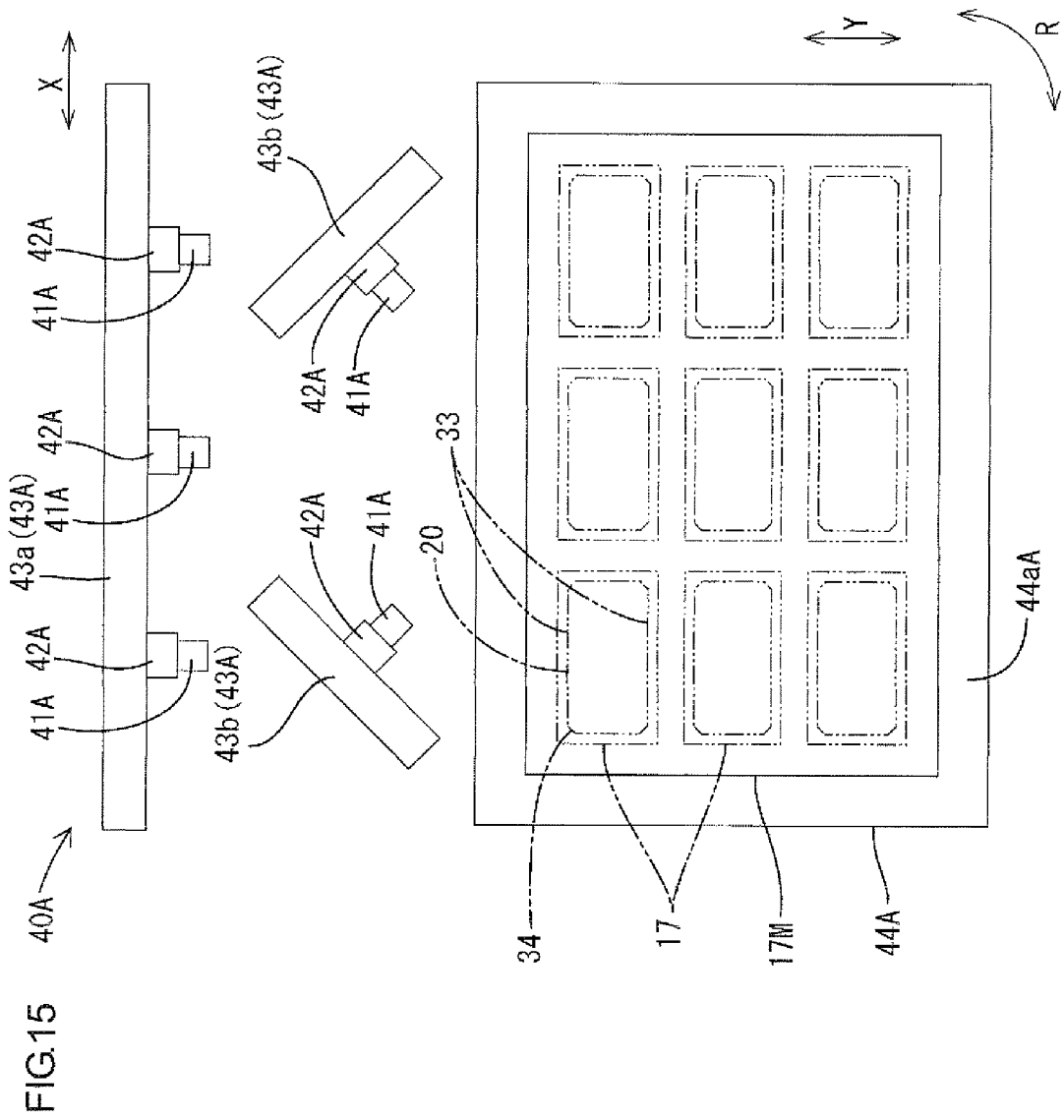
FIG. 15 is a plan view of an applicator according to an embodiment 2 of the present invention.

Referring to FIG. 15, the present applicator 40A includes a guide 43A formed of separate parts, i.e., a guide body 43a and a pair of inclined guides 43b. Specifically, the guide body 43a has a linear shape, and the length thereof is set to be slightly larger than the length of the long side of a CF substrates' parent material 17M. On the other hand, each inclined guide 43b is arranged oblique to the length direction of the guide body 43a, and has a linear shape along the oblique direction. The inclination of the inclined guide 43b from the guide body 43a is set to conform to the inclination of the oblique portion 34A of the sealant portion 20 from the straight portion 33A (or, from the side of the CF substrate 17). Specifically, it is set to 45 degrees. The two inclined guides 43b, i.e., right and left inclined guides shown in FIG. 15, are reversely inclined from the guide body 43a, and therefore the length directions thereof intersect each other. The angle therebetween is set to substantially 90 degrees. The two inclined guides 43b are arranged symmetrically to each other. Specifically, the inclined guides 43b are located to be displaced from the guide body 43a in the direction Y shown in FIG. 15. Further, they are arranged in the direction X so that the whole lengths thereof are within the length of the guide body 43a.

Slide grooves (not shown) are formed on the side surface of the guide body 43a and the side surface of each inclined guide 43b so as to be along their length directions. Dispenser bodies 42A are mounted to the slide grooves so as to be slidable along the slide grooves. Three dispenser bodies 42A are attached to the guide body 43a, while one dispenser body 42A is attached to each inclined guide 43b. The nozzles 41A of the dispenser bodies 42A attached to the guide body 43a are used for the application of straight portions 33A of the sealant portion 20, while the nozzles 41A of the dispenser bodies 42A attached to the inclined guides 43b are used for the application of oblique portions 34A.

In the applicator 40A, a stage 44A is provided to be movable in two directions, i.e., the length direction of the guide body 43a and a direction perpendicular thereto (the directions X and Y shown in FIG. 15).

<Sealant Application Process and Reinforcing Portion Application Process>

In the present embodiment, sealant portions 20 are applied to the CF substrates' parent material 17M, i.e., one of two parent materials 17M, 18M, by a sealant application process using the above applicator 40A. In contrast, reinforcing portions 35A are applied to the array substrates' parent material 18M, i.e., the other of the two parent materials 17M, 18M (or the parent material 18M other than the parent material 17M to be subjected to the application of the sealant portions 20), by a reinforcing portion application process using an applicator (not shown) other than the above applicator. Each reinforcing portion 35A is arranged between the oblique portion 34 of the sealant portion 20 and a corner point of the substrates 17, 18. The reinforcing portion 35A is provided as a point-like portion that is unconnected with the sealant portion 20 (See FIG. 21) as described below.

Figure 16:
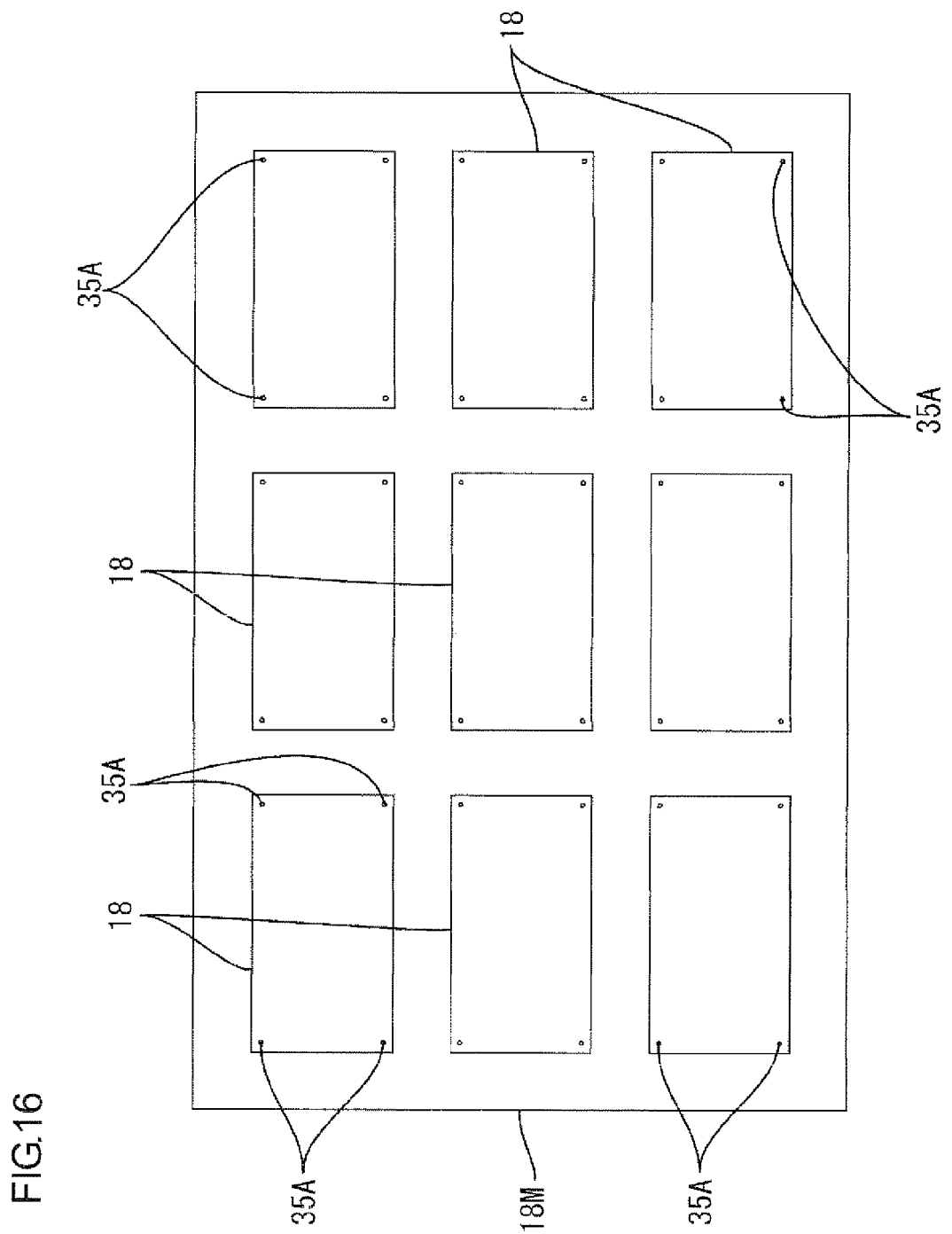
FIG. 16 is a plan view of a parent material for array substrates when application of reinforcing portions thereon is completed.

First, the reinforcing portion application process will be explained. The reinforcing portions 35A are applied on the array substrates' parent material 18M, i.e., one of the parent materials 17M, 18M, by using an applicator not shown. The applicator to be used by the present process has a construction nearly identical to the applicator 40 shown in the embodiment 1, except that the stage 44 thereof lacks rotation capability. Therefore, the detailed explanation thereof will be omitted. On the array substrates' parent material 18M placed on the stage, the nozzles are positioned at the application positions of the reinforcing portions, and the point-like reinforcing portions 35A are sequentially applied as shown in FIG. 16.

Figure 17:
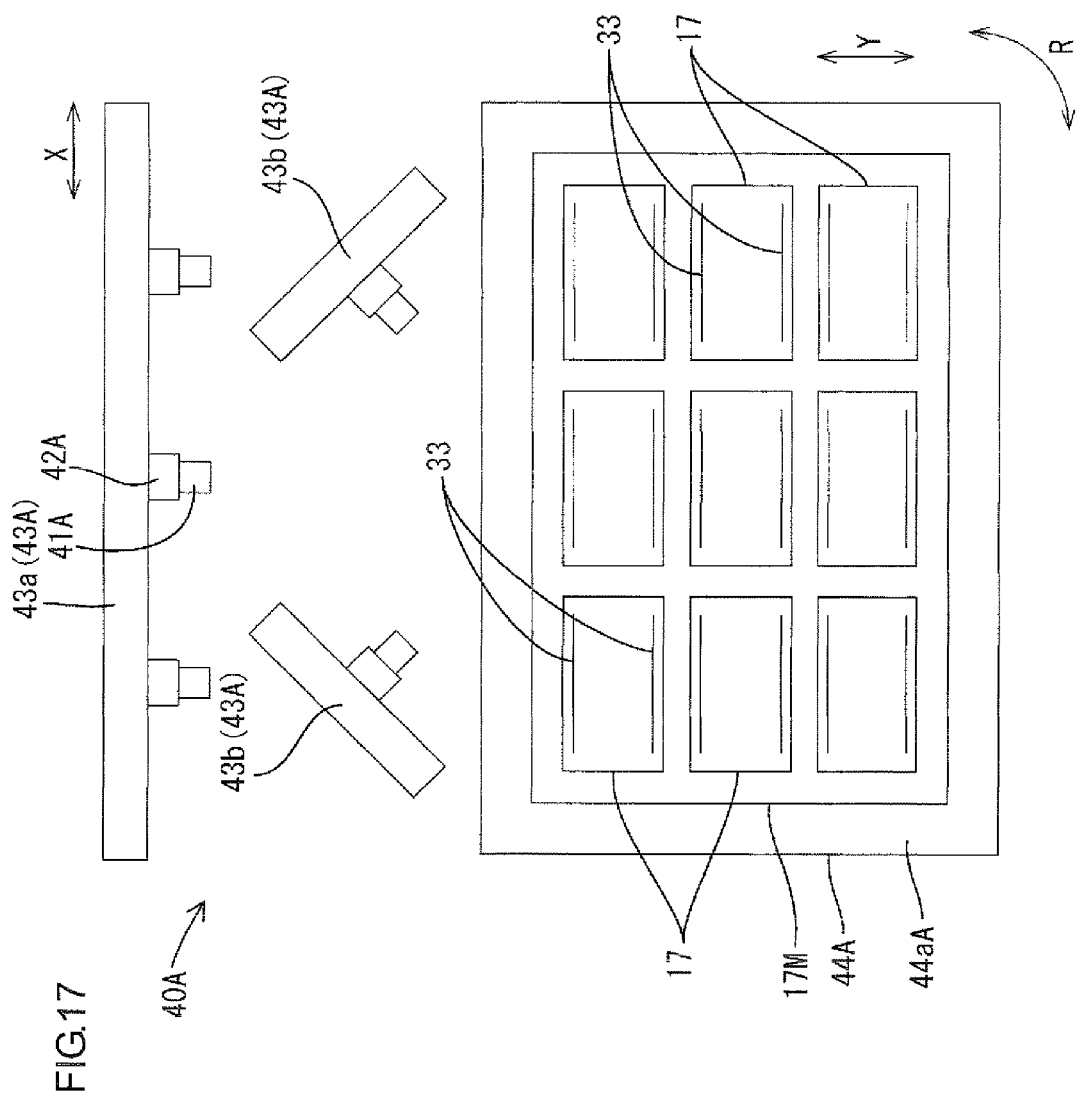
FIG. 17 is a plan view showing when application of straight portions along the long sides is completed by a sealant application process.
Figure 18:
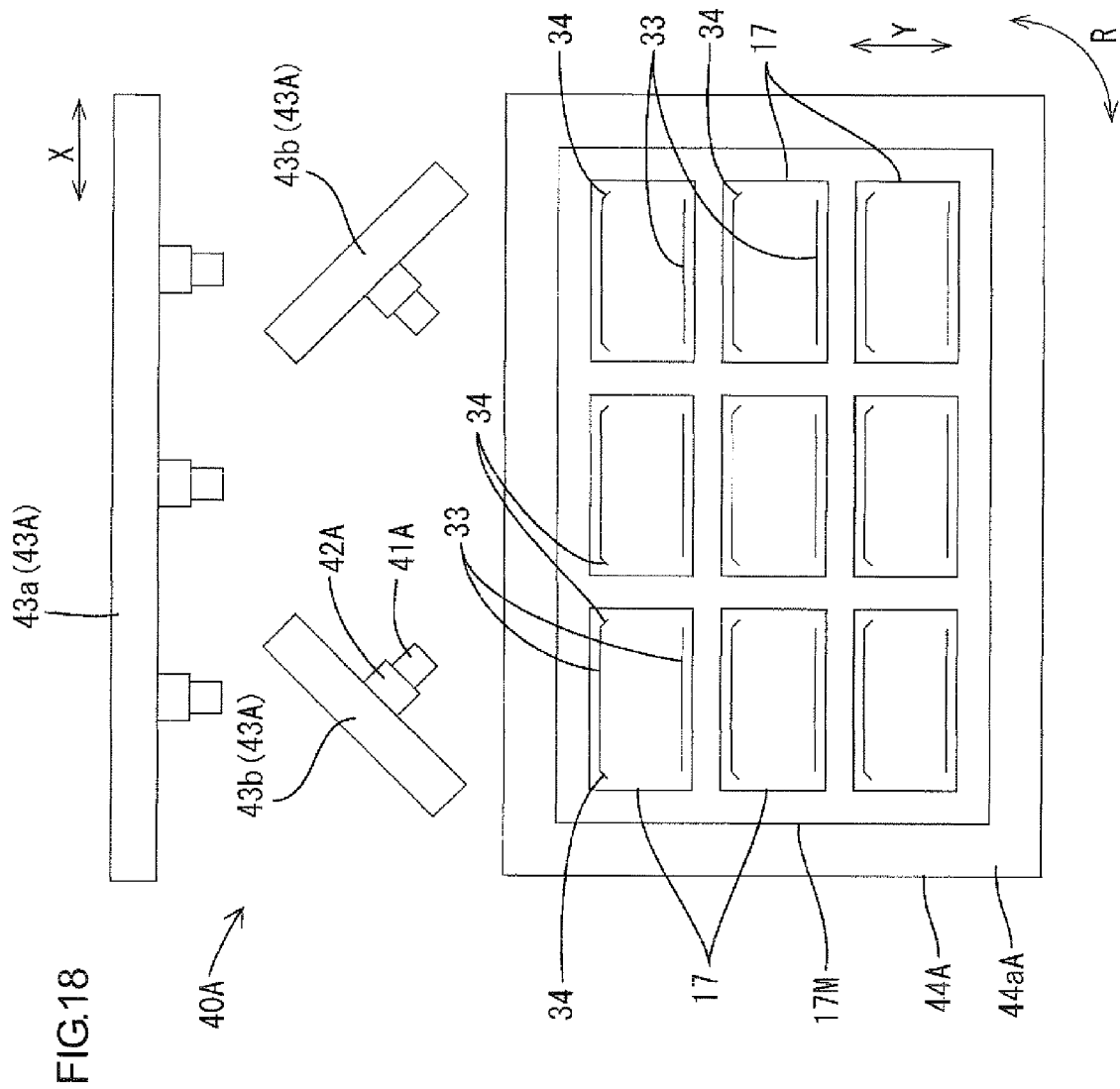
FIG. 18 is a plan view showing when application of two oblique portions aligned along the length direction of a guide is completed by the sealant application process.
Figure 19:
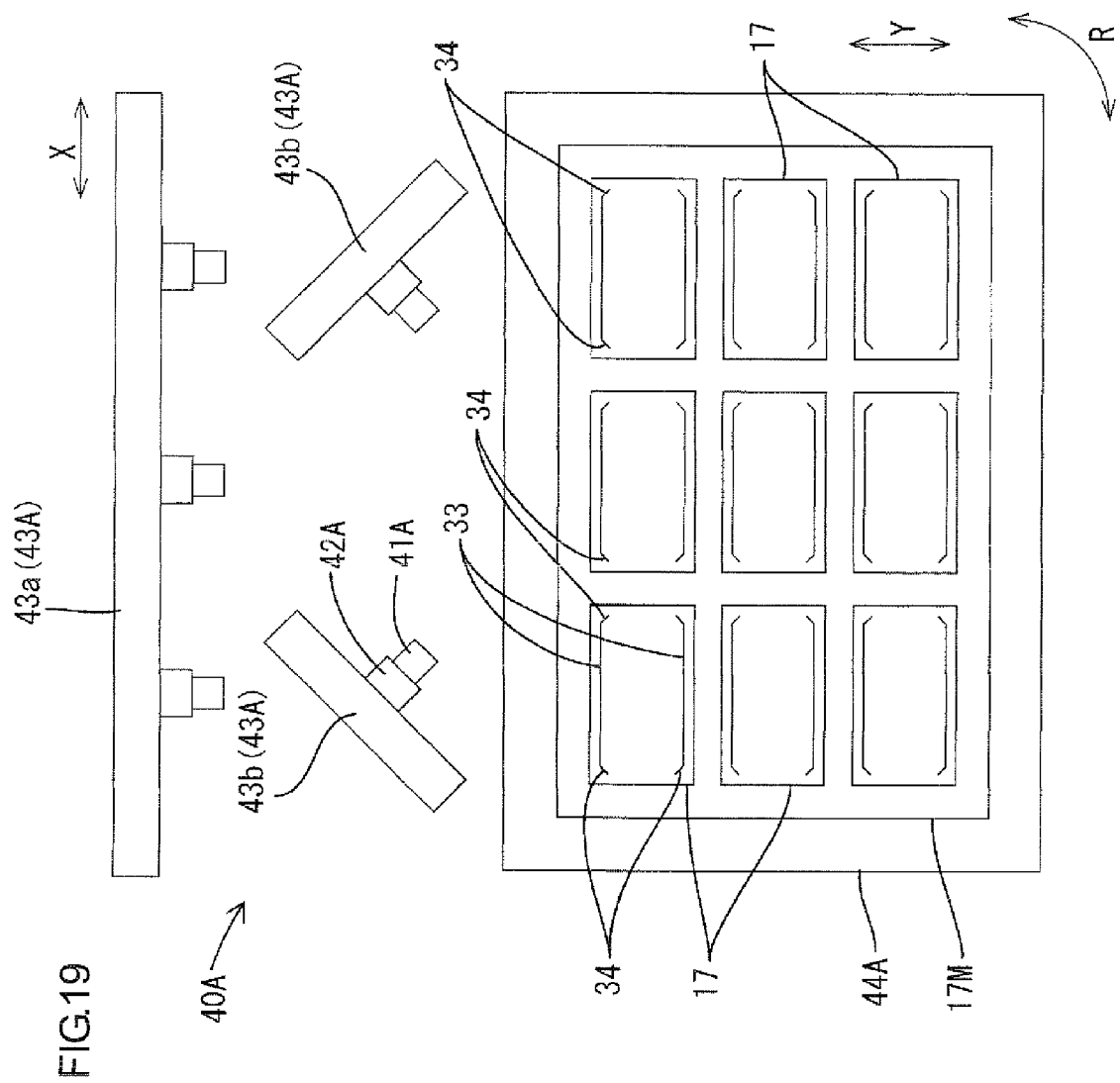
FIG. 19 is a plan view showing when application of the other oblique portions is completed by the sealant application process.
Figure 20:
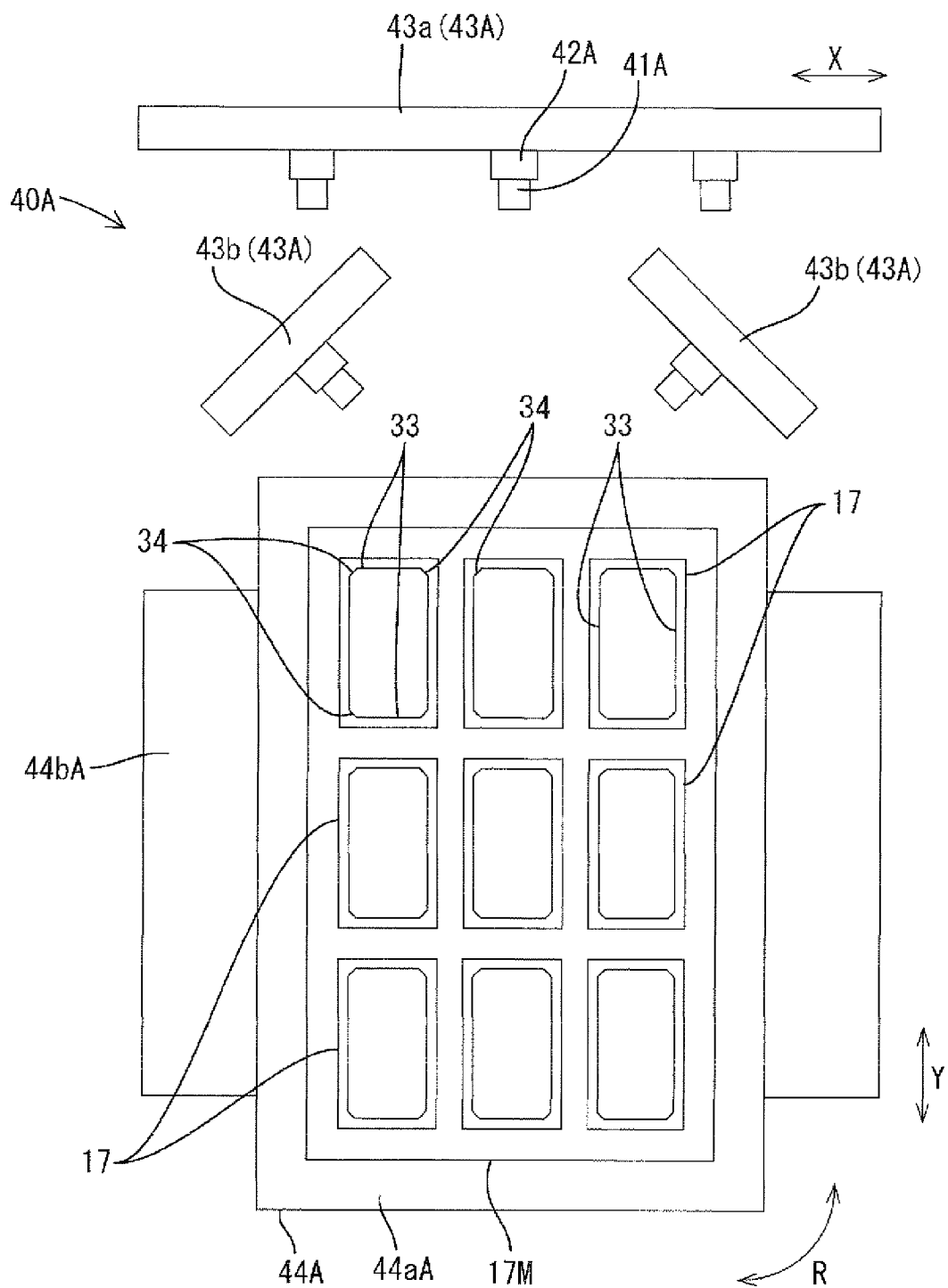
FIG. 20 is a plan view showing when application of straight portions along the short sides is completed by the sealant application process.
Figure 21:
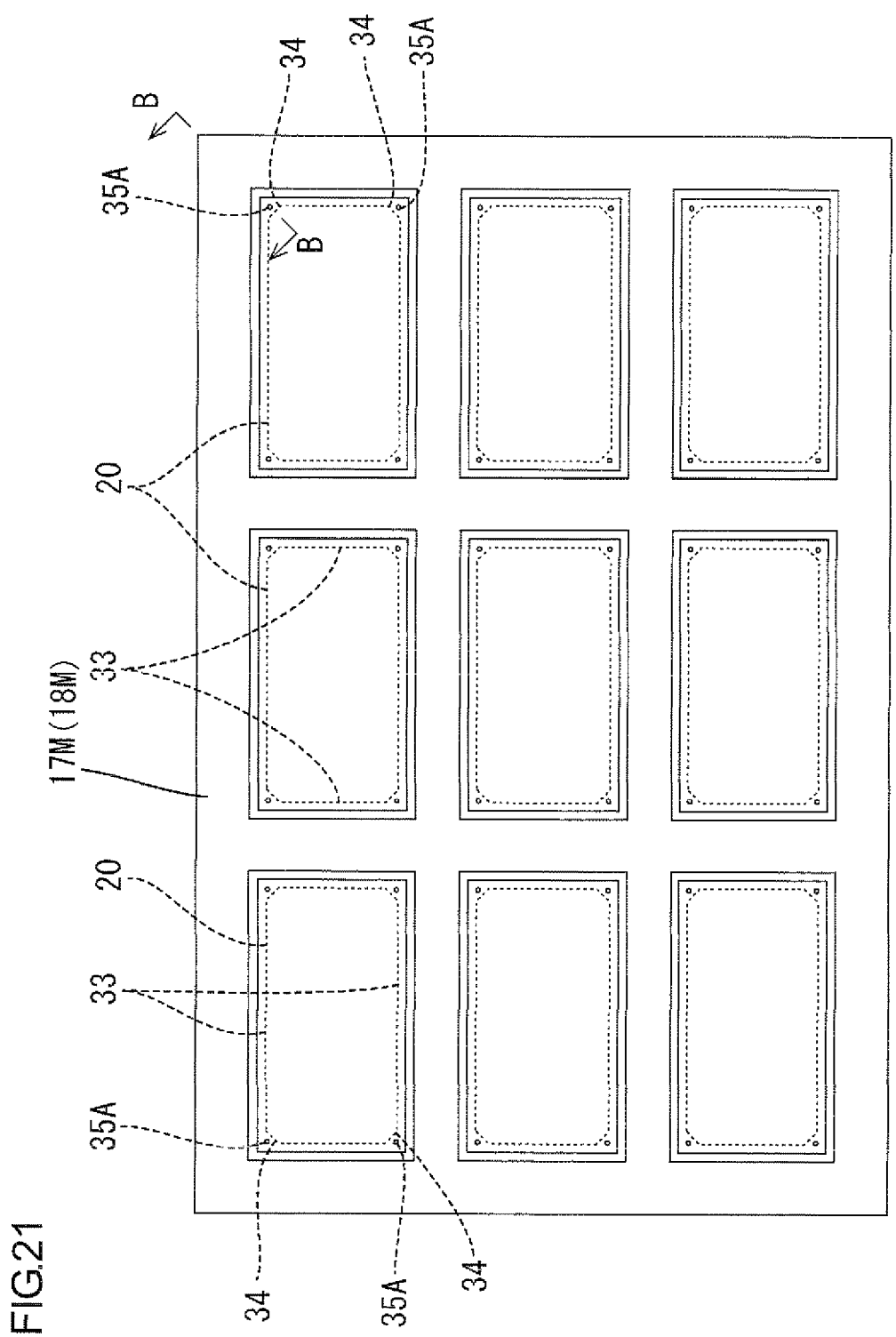
FIG. 21 is a plan view showing the two parent materials when attached to each other.
Figure 22:
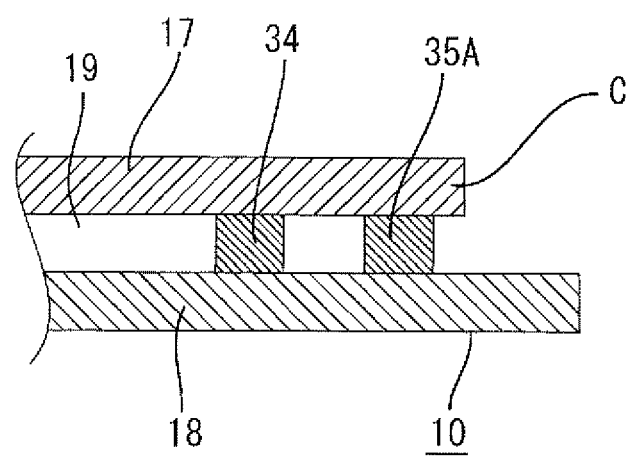
FIG. 22 is a sectional view of FIG. 21 along the line B-B.

Next, the sealant application process will be explained. Referring to FIG. 15, the CF substrates' parent material 17M is placed on the substrate rest 43a A, while the substrate rest 44aA is maintained on the stage 44A so that the long side thereof is parallel to the length direction of the guide body 43a. The nozzles 41A are positioned at the application positions of straight portions 33 of the sealant portions 20 along the long side, by the movement of the stage 44A and the movement of the dispenser bodies 42A on the guide body 43a. Then, a resin material is ejected from the nozzles 41A while the dispenser bodies 42A are slid on the guide body 43a. Thereby, the straight portions 33 of the sealant portions 20 along the long side are applied as shown in FIG. 17. When the application of the straight portions 33 along the long sides of the CF substrates 17 is completed, the nozzles 41A are positioned at the application positions of two oblique portions 34 of the sealant portion 20, or specifically, the oblique portions 34 to be formed parallel to the respective inclined guides 43b, by the movement of the stage 44 and the movement of the dispenser bodies 42A on the inclined guides 43b. The resin material is ejected from the nozzles 41A while the dispenser bodies 42A are slid on the inclined guides 43b. Thereby, two oblique portions 34 of each sealant portion 20 are applied so as to be located on the same side thereof, as shown in FIG. 18.

Thereafter, the substrate rest 44aA on the stage 44A is rotated 180 degrees with respect to the support base 44bA. Then, by the movement of the stage 44 and the movement of the dispenser bodies 42A on the inclined guides 43b, the nozzles 41A are positioned at the application positions of oblique portions 34 to be formed parallel to the respective inclined guides 43b. Thereafter, the other oblique portions 34 are applied in a similar manner to the above application of the two oblique portions 34 (See FIG. 19). When the application of all oblique portions 34 is completed, the substrate rest 44aA is rotated 90 degrees so that the short side of the substrate rest 44aA is arranged parallel to the guide body 43a. Then, the nozzles 41A are positioned at the application positions of straight portions 33 along the short side, by the movement of the stage 44A and the movement of the dispenser bodies 42A on the guide body 43a. Thereafter, referring to FIG. 20, the straight portions 33 along the short side are applied in a similar manner to the above application of the straight portions 33 along the long side.

<Liquid Crystal Dropping Process and Attachment Process>

A liquid crystal material is dropped on the CF substrates' parent material 17M that has undergone the application of the sealant portions 20 as described above. Then, the array substrates' parent material 18M having undergone the application of the reinforcing portions 35A is attached thereto. Thereafter, the light from an exposure device and/or the heat is applied to the sealant portions 20 and the reinforcing portions 35, so that they are hardened and fixed to the parent materials 17M, 18M. In the resultant structure, referring to FIGS. 21 and 22, each reinforcing portion 35A is located at the outer side of the oblique portion 34 of the sealant portion 20 but at the inner side of the corner point of the substrate 17, 18. The reinforcing portion 34 has a substantially circular horizontal section, and is arranged to be unconnected with or separated from the sealant portion 20.

As explained above, in the reinforcing portion application process of the manufacturing method for a liquid crystal panel 10 according to the present embodiment, the reinforcing portions 35A are applied on the array substrate 18, i.e., one of the substrates 17, 18, or specifically, the other substrate than the CF substrate 17 to be subjected to the application of the sealant portion 20. The present method is suitable for shortening the processing time, because the process for the application of the sealant portion 20 and the process for the application of the reinforcing portions 35A can be performed parallel and simultaneously. Further, the operation of the applicator 40A can be simplified, compared to a case where the application of a sealant portion and the application of reinforcing portions are consecutively performed for the same substrate by using the same applicator.

Further, according to the present embodiment, the guide 43A of the applicator 40A includes a guide body 43a having a linear shape and inclined guides 43b arranged oblique to the guide body 43a. The inclination of the inclined guide 43b from the guide body 43a is set to conform to the inclination of the oblique portion 34 from the sides of the substrate 17, 18. According to the construction, the sealant portion 20 except for the oblique portions 34 can be applied while the dispenser bodies 42A are slid on the guide body 43a. Thereafter, without rotating the stage 44A, the oblique portions 34 of the sealant portion 20 can be applied while the dispenser bodies 42A are slid on the inclined guides 43b. Thus, the frequency of rotation of the stage 44A can be reduced, resulting in reduction of the processing time.

Moreover, the inclined guides 43b are provided as parts separated from the guide body 43a, and are arranged so that the whole lengths thereof are within the length of the guide body 43a. According to the construction, the applicator can be provided with a reduced size.

Embodiment 3

An embodiment 3 of the present invention will be explained with reference to FIGS. 23 to 26. The present embodiment 3 shows a modification that includes an applicator 40B differing in construction from that of the embodiment 2. In the present embodiment 3, the parts called by the same names as those of the above embodiment 2 are designated by the same symbols, even if they differ in construction. However, the suffix "B" is attached to the symbols. The redundant explanations for the constructions and operational effects will be omitted.

<Applicator>

Figure 23:
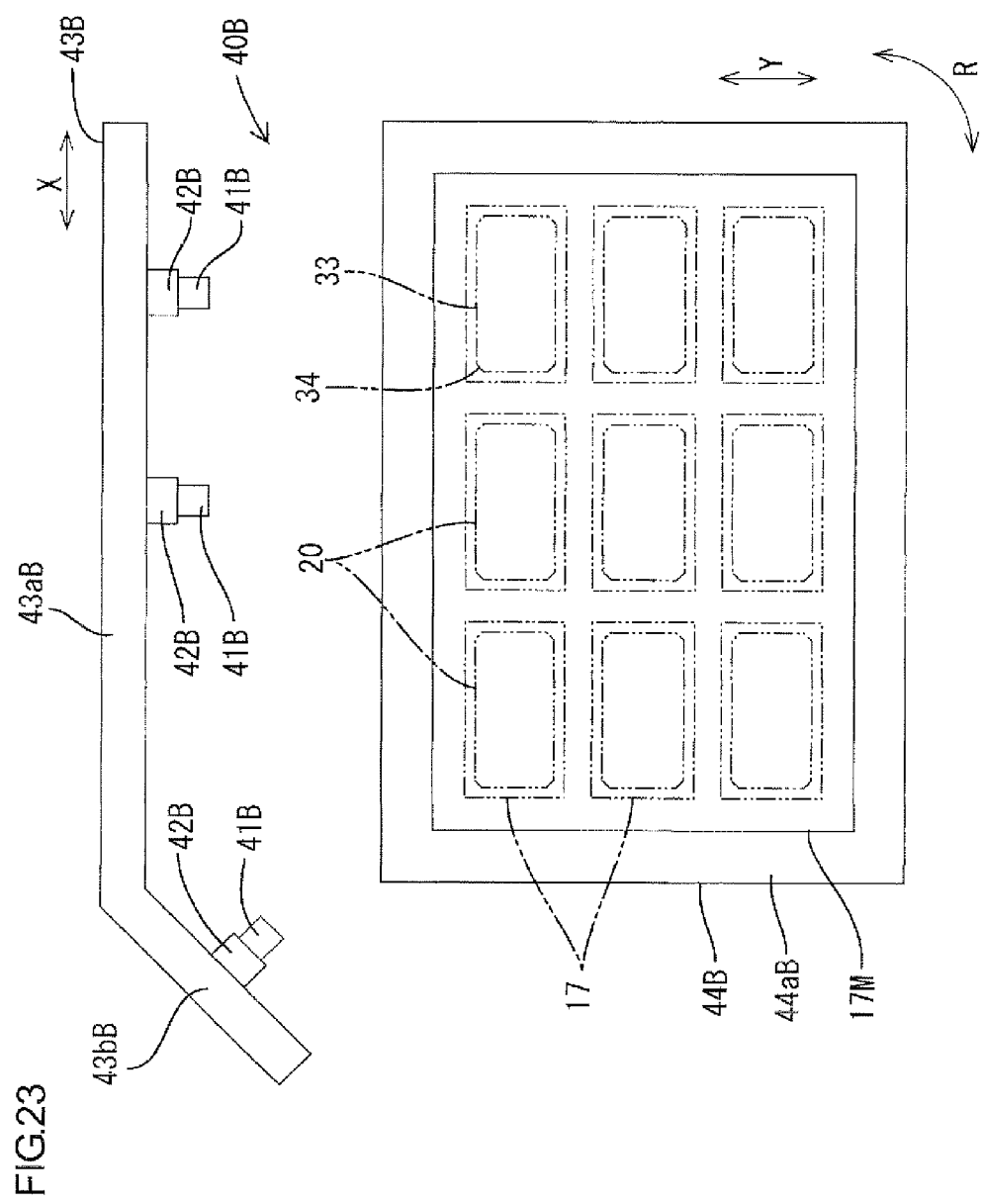
FIG. 23 is a plan view of an applicator according to an embodiment 3 of the present invention.

Referring to FIG. 23, the present applicator 40B includes a guide 43B formed of a guide body 43aB and an inclined guide 43bB, which are connected to each other. Specifically, the guide body 43aB has a linear shape, and the length thereof is set to be slightly larger than the length of the long side of the CF substrates' parent material 17M. On the other hand, the inclined guide 43bB is arranged oblique to the length direction of the guide body 43aB, and has a linear shape along the oblique direction. The inclination of the inclined guide 43bB from the guide body 43aB is set to conform to the inclination of the oblique portion 34 of the sealant portion 20 from the straight portion 33 (or, from the side of the substrates 17, 18). Specifically, it is set to 45 degrees. The inclined guide 43bB is connected to an end portion of the guide body 43aB. Slide grooves (not shown) are formed on the side surface of the guide body 43aB and the side surface of the inclined guide 43bB, so as to be along the length directions thereof and communicate with each other. A total of three dispenser bodies 42B are mounted to the slide grooves. The dispenser bodies 42B can slide along the slide grooves while moving freely between the guide body 43a2 and the inclined guide 43bB.

<Sealant Application Process and Reinforcing Portion Application Process>

In the present embodiment, sealant portions 20 and reinforcing portions are applied on different parent materials by using different applicators, as in the above embodiment 2. The reinforcing portion application process can be performed in a similar manner to that of the embodiment 2, and therefore the explanation thereof will be omitted.

Figure 24:
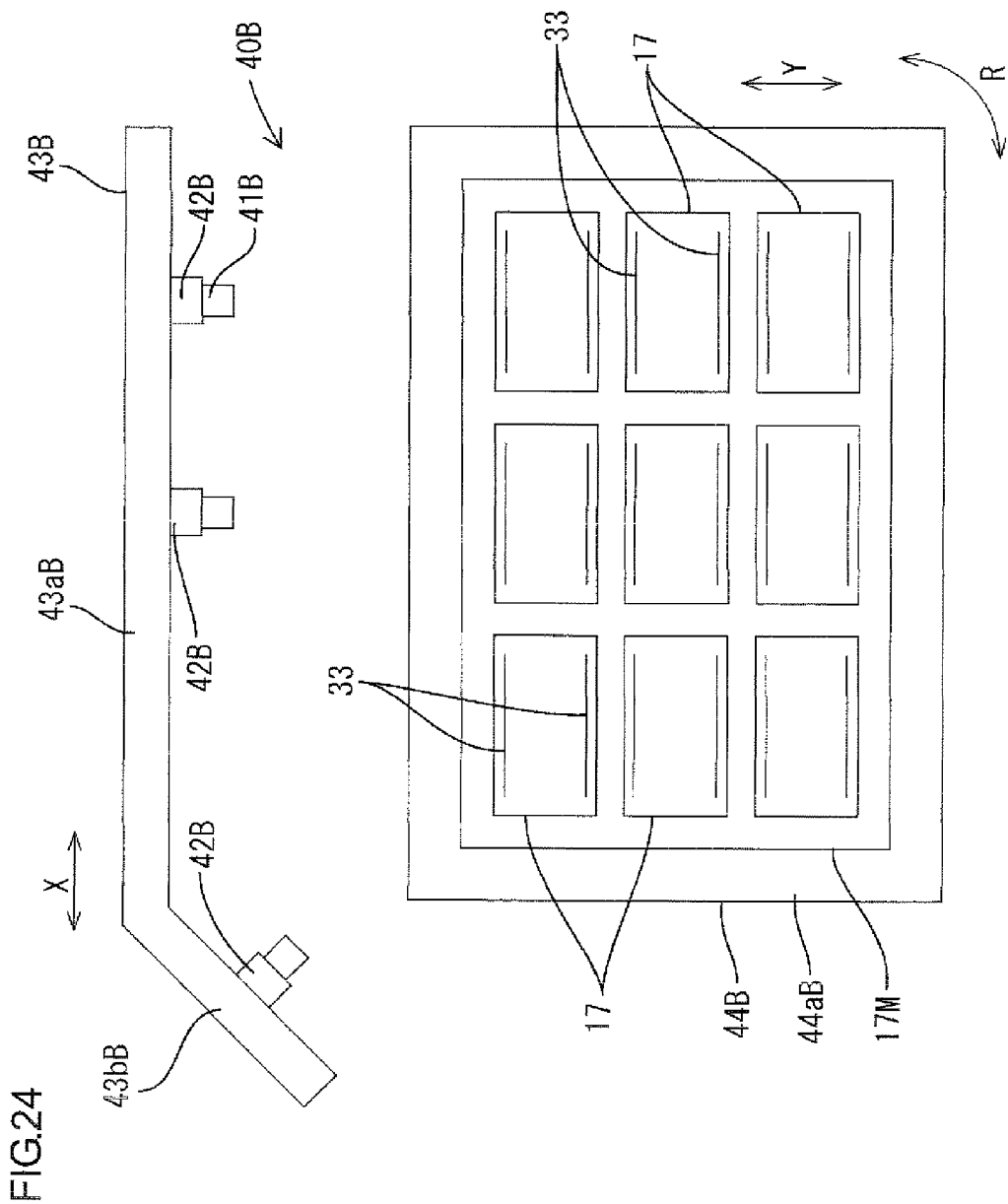
FIG. 24 is a plan view showing when application of straight portions along the long sides is completed by a sealant application process.
Figure 25:
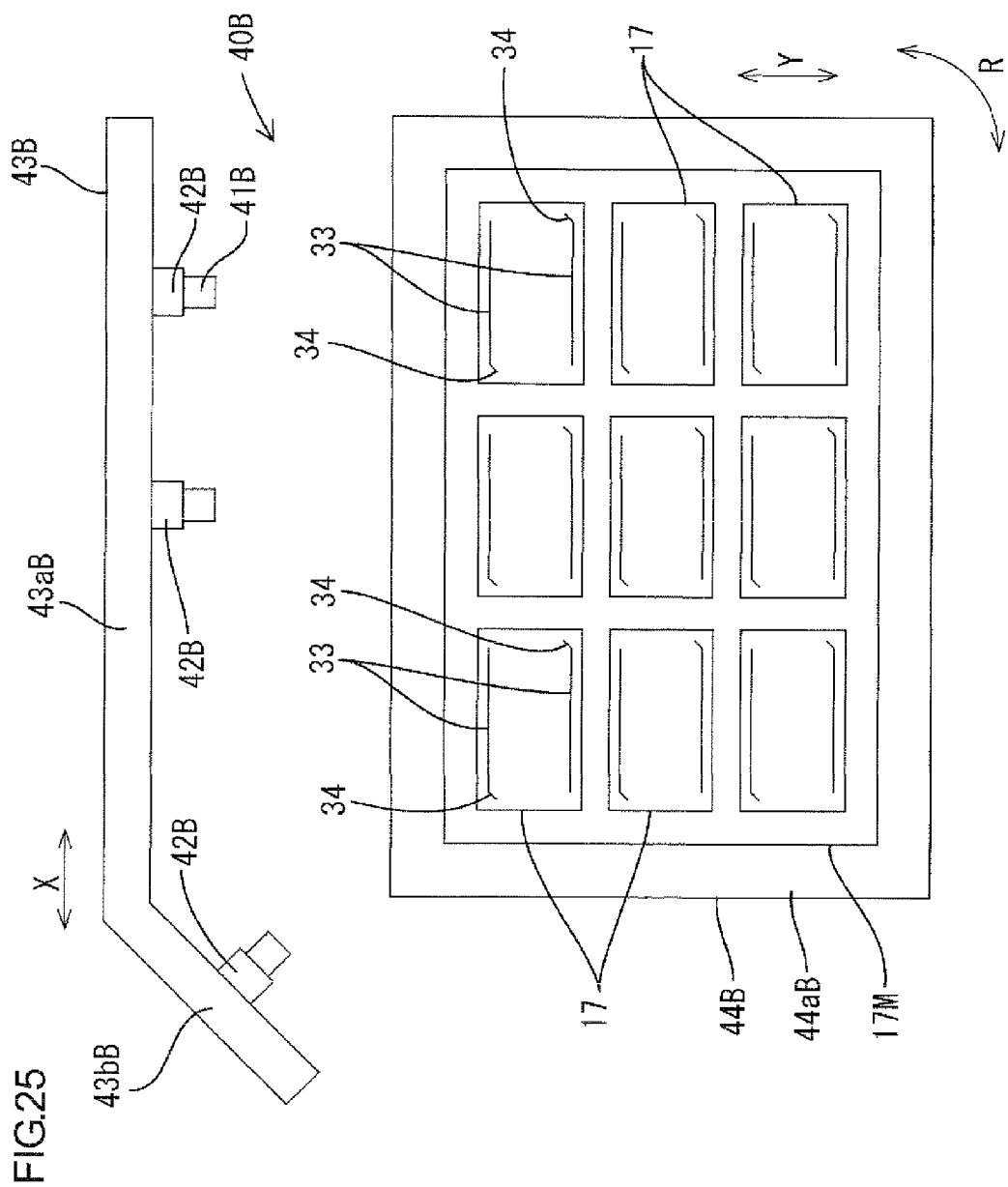
FIG. 25 is a plan view showing when application of two oblique portions located at corners opposed to each other is completed by the sealant application process.

The sealant application process will be explained. Referring to FIG. 23, the CF substrates' parent material 17M is placed on the substrate rest 44aB, while the substrate rest 44aB is maintained on the stage 44B so that the long side thereof is parallel to the length direction of the guide body 43aB. The nozzles 41B are positioned at the application positions of straight portions 33 of the sealant portions 20 along the long side, by the movement of the stage 44B and the movement of the dispenser bodies 42B on the guide body 43aB. Then, a resin material is ejected from the nozzles 41B while the dispenser bodies 42B are slid on the guide body 43aB. Thereby, the straight portions 33 of the sealant portions 20 along the long side are applied as shown in FIG. 24. When the application of the straight portions 33 along the long sides of the CF substrates 17 is completed, the nozzle 41B is positioned at the application position of the oblique portion 34 of the sealant portion 20, or specifically, the oblique portion 34 to be formed parallel to the inclined guide 43bB, by the movement of the stage 44B and the movement of the dispenser body 42B on the inclined guide 43bB. The resin material is ejected from the nozzle 41B while the dispenser body 42B is slid on the inclined guide 43bB. In this way, two oblique portions 34 of each sealant portion 20 are applied so as to be located at its corners opposed to each other, as shown in FIG. 25.

Figure 26:
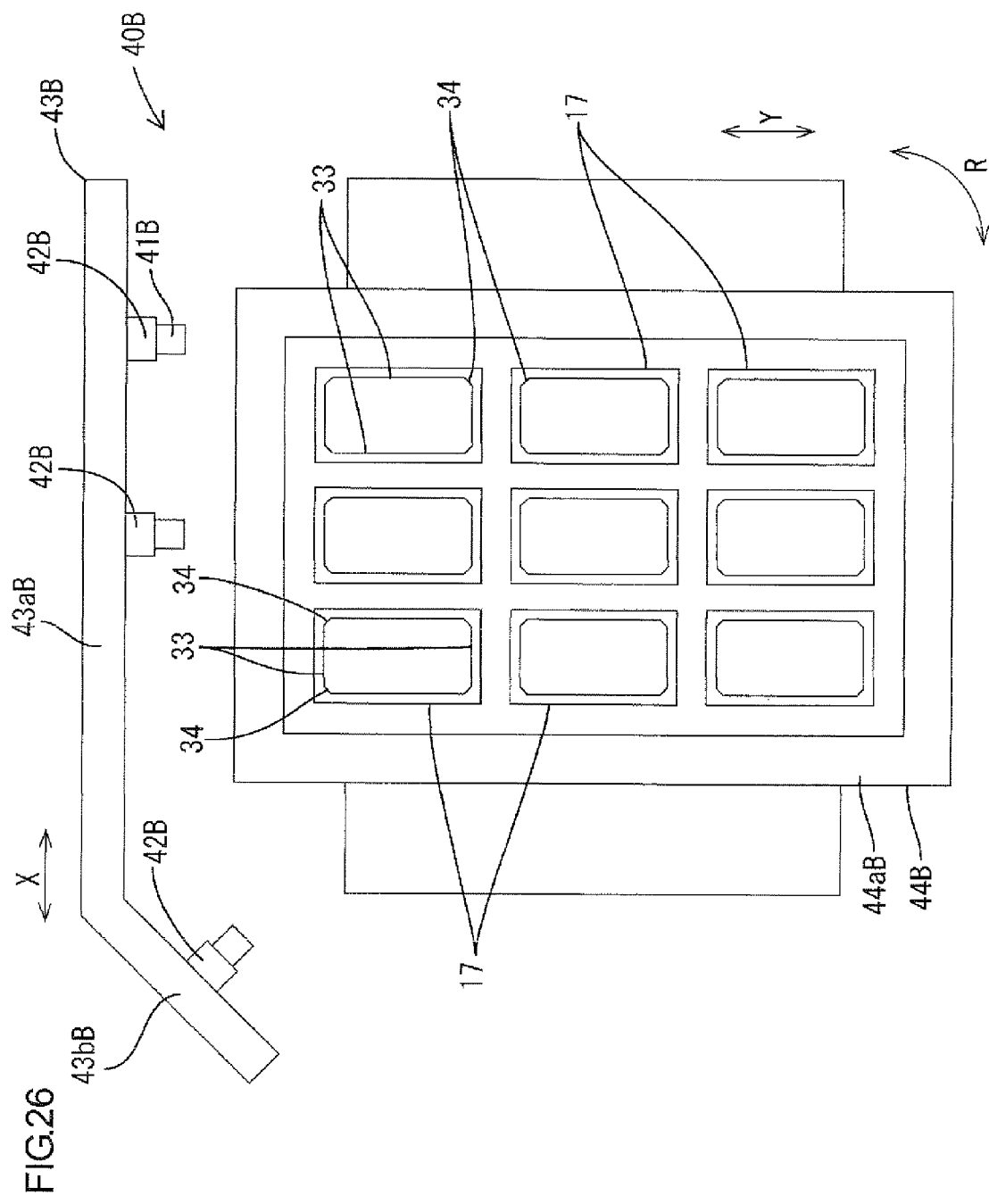
FIG. 26 is a plan view showing when application of straight portions along the short sides and application of the other oblique portions are completed by the sealant application process.

Thereafter, the substrate rest 44a2 on the stage 44B is rotated 90 degrees with respect to the support base 44b2, as shown in FIG. 26. Thereby, the short side of the substrate rest 44aB is arranged parallel to the guide body 43aB. Then, the nozzles 41B are positioned at the application positions of straight portions 33 along the short side, by the movement of the stage 44B and the movement of the dispenser bodies 42B on the guide body 43aB. Thereafter, the straight portions 33 along the short sides are applied in a similar manner to the above application of the straight portions 33 along the long sides. When the application of the straight portions 33 along the short sides of the CF substrates 17 is completed, the dispenser body 42B is moved on the inclined guide 43bB concurrently with the movement of the stage 44B, so as to be positioned at the application position of the oblique portion 34 to be formed parallel to the inclined guide 43b2. Then, the other oblique portions 34 are applied in a similar manner to the above application of the two oblique portions 34.

As explained above, in the applicator 40B according to the present embodiment, the inclined guide 43bB is connected to the guide body 43aB, so that the dispenser body 42B is movable between the inclined guide 43bB and the guide body 43aB. According to the construction, the dispenser body 42B can be shared by the inclined guide 43bB and the guide body 43aB, and therefore the number of dispenser bodies 42B can be reduced, resulting in cost reduction.

Embodiment 4

Figure 28:
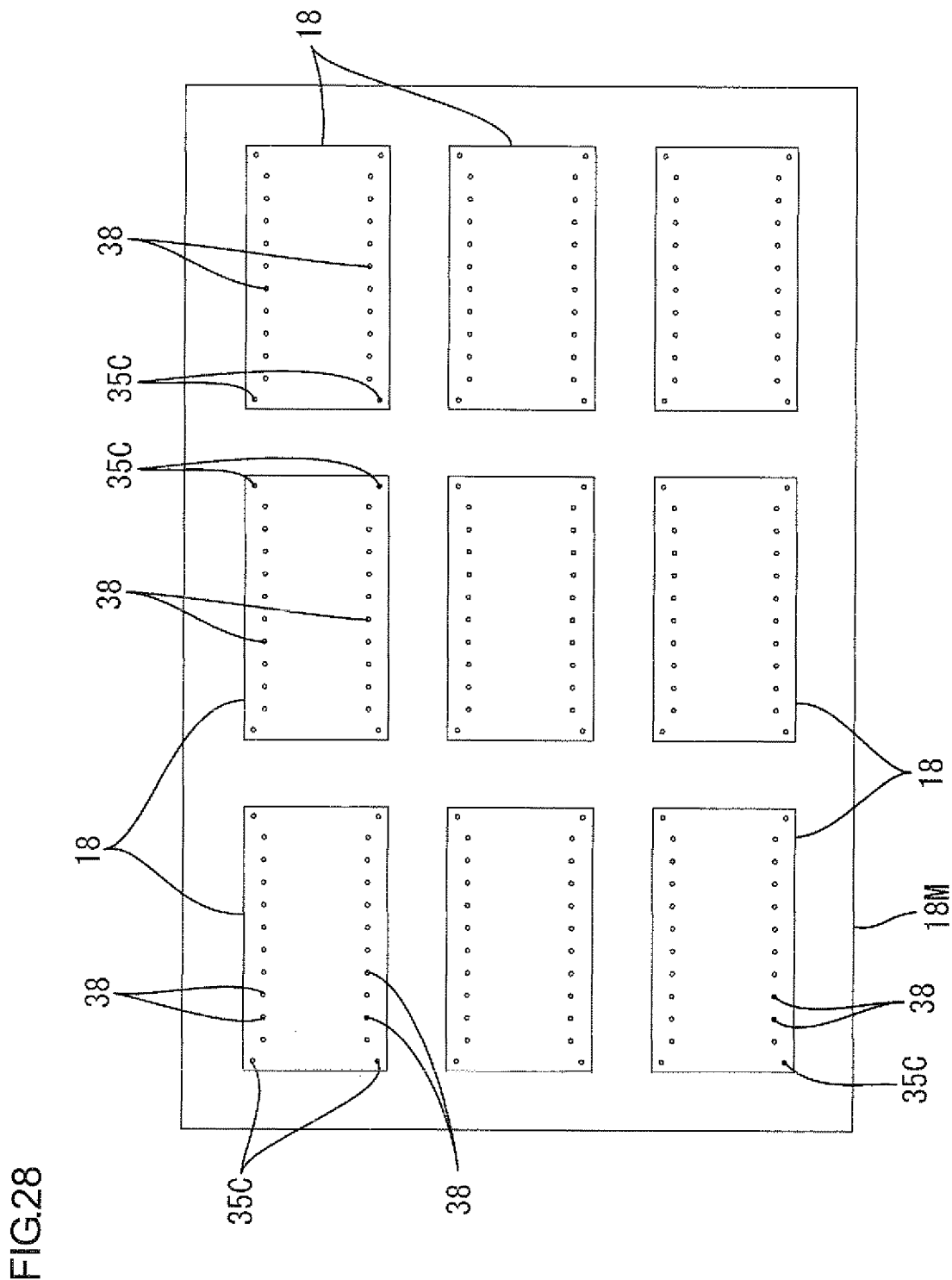
FIG. 28 is a plan view of a parent material for array substrates when application of connecting portions and reinforcing portions thereon is completed.
Figure 29:
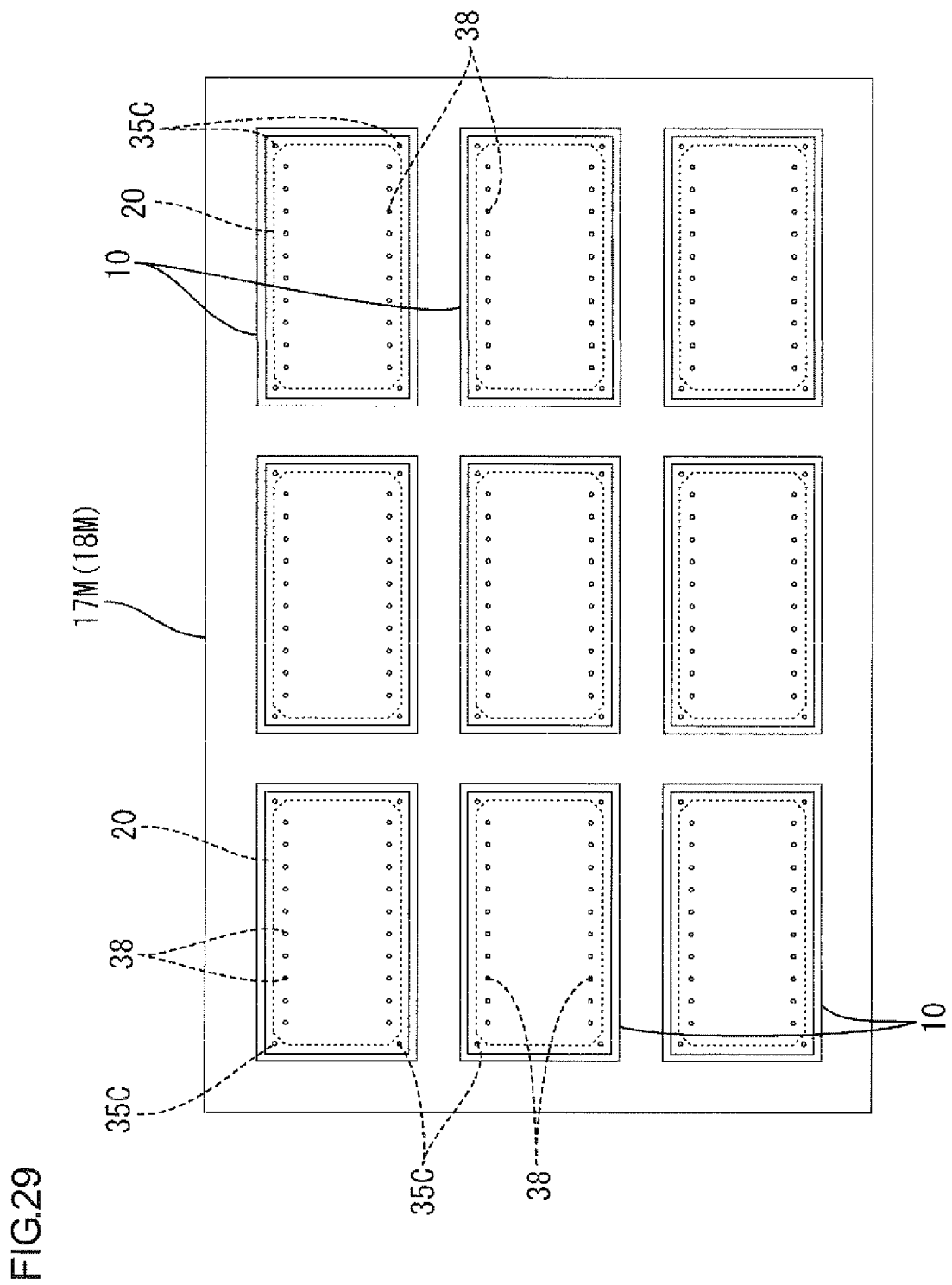
FIG. 29 is a plan view showing the two parent materials when attached to each other.

An embodiment 4 of the present invention will be explained with reference to FIGS. 27 to 29. The present embodiment 4 shows a modification in which the material and the application process of reinforcing portions 35C are changed. In the present embodiment 4, the parts called by the same names as those of the above embodiment 1 are designated by the same symbols, even if they differ in construction. However, the suffix "C" is attached to the symbols. The redundant explanations for the constructions and operational effects will be omitted.

<Array Substrate>

On the array substrate 18, a number of gate wiring lines 24 and source wiring lines 25 are arranged in a grid pattern (See FIG. 3), as described in the above embodiment 1. In the end areas of the array substrate 18, referring to FIG. 27, terminal sections 36 are provided as end portions of the gate wiring lines 24 and source wiring lines 25. Flexible boards not shown, which are connected to an external circuit, are connected to the terminal sections 36 via ACFs (Anisotropic Conductive Films as anisotropic conductive adhesives), by pressure bonding. Each flexible board is formed of a flexible thin film on which a driver e.g., as an LSI chip, is mounted. Specifically, the flexible board can be provided as a so-called TCP (Tape Carrier Package) or SOF (System On Film).

In addition to the wiring lines 24, 25 described above, conductive pads 37 are provided on the array substrate 18, through which a voltage is applied to the counter electrode 30 provided on the CF substrate 17 side. Referring to FIGS. 28 and 29, a connecting portion 38 formed of a conductive resin material is fixed to each conductive pad 37. The connecting portion 38 is arranged to penetrate the liquid crystal layer 19, and is fixed to the counter electrode 30 on the CF substrate 17. The connecting portion 38 has a substantially column-like shape and a circular horizontal section. The conductive resin material of the connecting portions 38 is formed of the same resin material as the sealant portion 20 (e.g., ultraviolet curable resin material or UV/heat dual-curable resin material), but has conductivity due to including a predetermined density of conductive particles, e.g., resin particles such as PBs (Plastic Balls) coated with a conductive material such as gold. Via the connecting portions 38 thus formed of the conductive resin material, the conductive pads 37 on the array substrate 18 can be electrically connected the counter electrode 30 on the CF substrate 17.

Figure 27:
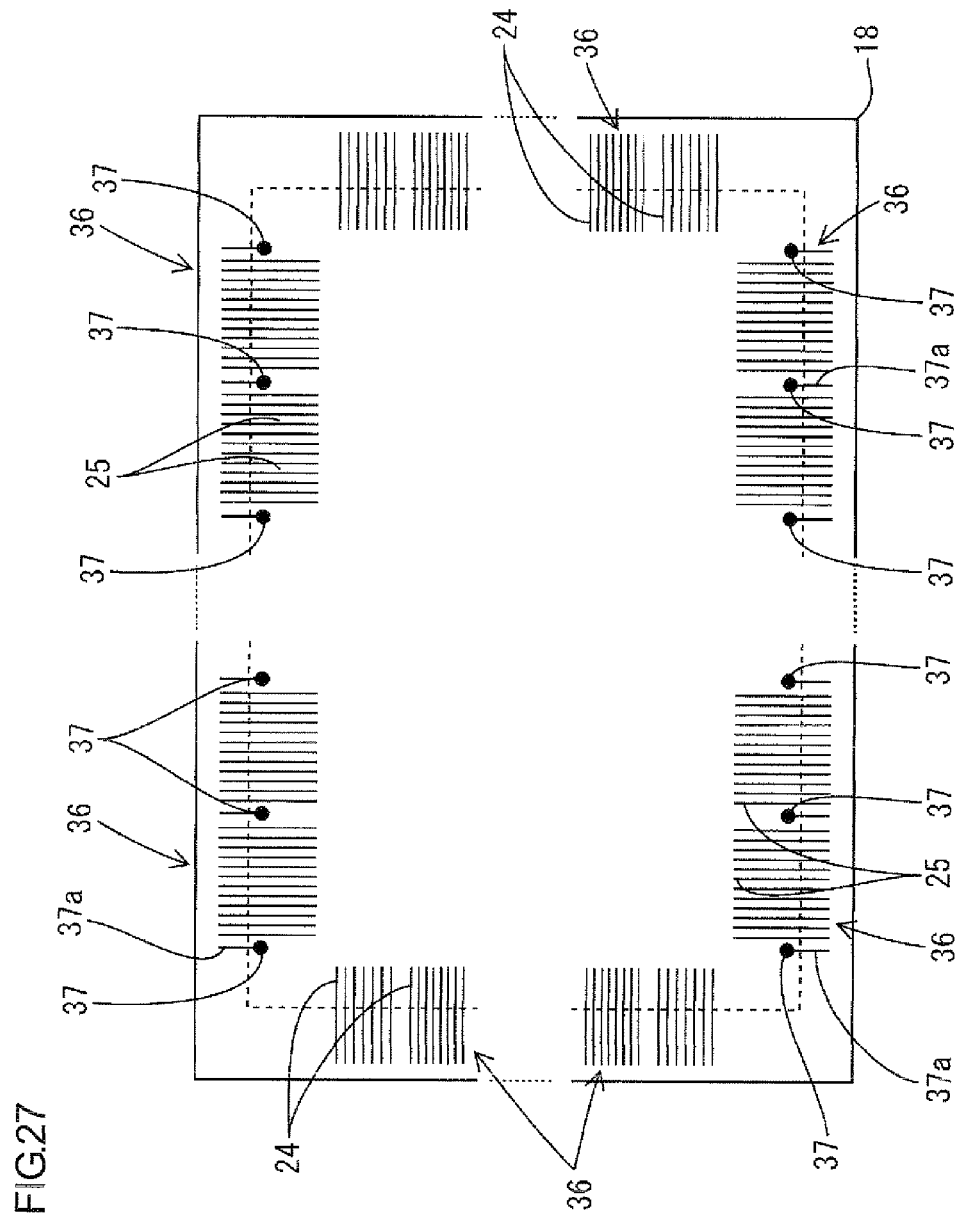
FIG. 27 is a plan view showing the terminals arranged on an array substrate according to an embodiment 4 of the present invention.

As shown in FIG. 27, the plurality of conductive pads 37 are located in the vicinities of the terminal sections 36 of the source wiring lines 25. A wire lead 37a extends from each conductive pad 37 and along the source wiring line 25. The terminal portion of the wire lead 37a is arranged in alignment with the terminal section 36 of the source wiring lines 25. The terminal portions of the wire leads 37a, together with the terminal section 36 of the source wiring lines 25, are electrically connected to the flexible board described above. Note that FIG. 27 provides a schematic illustration showing solely the characteristic parts of the wiring components 24, 25, 36, 37.

<Reinforcing Portion>

The reinforcing portions 35C have the same shapes as those of the embodiments 2 and 3, and are arranged on the liquid crystal panel 10 in a similar manner to the embodiments 2 and 3. However, they differ in being formed of the same conductive resin material as the connecting portions 38. The reinforcing portions 35C are formed by the same process of the manufacturing process as the connecting portions 38, as described below.

<Wiring Process>

In a manufacturing process of the liquid crystal panel 10, the array substrate treatment process for forming components of array substrates 18 on a surface of an array substrates' parent material 18M includes a wiring process for forming gate wiring lines 24 and source wiring lines 25. The conductive pads 37 (including wire leads 37a) are formed in the wiring process.

<Connecting Portion Application Process>

The panel assembly process after the array substrate treatment process includes a connecting portion application process for applying connecting portions 38 on the array substrates' parent material 18M, i.e., one of the two parent materials 17M, 18M. The connecting portion application process is performed using an applicator (not shown) capable of ejecting a conductive resin material. Thereafter, a reinforcing portion application process for applying reinforcing portions 35C is consecutively performed using the applicator that has been used by the connecting portion application process. That is, the connecting portion application process and the reinforcing portion application process are performed substantially as the single process. The detailed explanation of the applicator to be used by the process will be omitted, because it has a construction nearly identical to the applicator 40 shown in the embodiment 1, except that the stage 44 thereof lacks rotation capability. The detailed explanation of the process is as follows: On the array substrates' parent material 18M placed on the stage, the nozzles are positioned at the application positions of the connecting portions, and then the conductive resin material is ejected from the nozzles for application of the connecting portions 38. On the other hand, in order for application of the reinforcing portions 35C on the array substrates' parent material 18M, the nozzles are positioned thereon at the application positions of the reinforcing portions, and then the conductive resin material is ejected from the nozzles.

<Sealant Application Process>

In the present embodiment, the sealant portions 20 and the reinforcing portions 35C are applied on different parent materials by using different applicators, as in the above embodiments 2 and 3. In the sealant portion application process, the application of the sealant portions 20 can be performed using any one of the applicators described in the above embodiments 1 to 3, and similarly. The details of the process are similar to those of the embodiments 1 to 3, and therefore the explanation thereof will be omitted. However, in the case that the applicator described in the embodiment 1 is used for the present process, the operations for application of the reinforcing portions 35 should be skipped.

As explained above, according to the present embodiment, the manufacturing method of a liquid crystal panel 10 includes a wiring process for forming wiring components 24, 25, 36, 37 on the array substrate 18, i.e., one of the substrates 17, 18, or specifically, the substrate to be subjected to the application of the reinforcing portions 35C. The wiring components 24, 25, 36, 37 are arranged to be connected to the TFTs 22 connected to the pixel electrodes 23 or to be connected to the counter electrode 30 provided on the CF substrate 17, i.e., on the other substrate. The wiring components 24, 25, 36, 37 include conductive pads 37 to be connected to the counter electrode 30. The manufacturing method further includes a connecting portion application process for applying connecting portions 38 formed of a conductive resin material to the conductive pads 37. In the reinforcing portion application process, the reinforcing portions 35C formed of the same conductive resin material as the connecting portions 38 are applied using the applicator that is used by the connecting portion application process for the application of the connecting portions 38.

According to the method, the applicator cost can be reduced and further the processing time can be shortened, because the application of the connecting portions 38 and the application of the reinforcing portions 35C are performed using the same conductive resin material and the same applicator.

Other Embodiments

The present invention is not limited to the embodiments explained in the above description made with reference to the drawings. The following embodiments may be included in the technical scope of the present invention, for example.

(1) The shapes and/or the arrangement positions of the reinforcing portions are not limited to those of the above embodiments, but rather may be suitably changed. For example, the reinforcing portions may be provided as point-like portions having a polygonal or elliptical section. The present invention can further include linear reinforcing portions extending parallel to the oblique portions.

(2) In the above embodiments, the reinforcing portions are provided at all the corner sections of the liquid crystal panel. However, the reinforcing portions need riot necessarily be provided at all the corner sections. The present invention can include a construction having a corner section without a reinforcing portion.

(3) In the above embodiments, the reinforcing portions are provided so that one reinforcing portion is arranged at each corner section of the liquid crystal panel. However, the present invention can include a construction in which a plurality of reinforcing portions are arranged at one corner section, for example.

(4) On the sealant portion of the above embodiments, the angle between the oblique portion and the straight portion along the long side and the angle between the oblique portion and the straight portion along the short side are set to the same angle, i.e., 45 degrees. However, the present invention can include a construction in which the angle between the oblique portion and the straight portion along the long side differs from the angle between the oblique portion and the straight portion along the short side. Further, the length of the oblique portion may be suitably changed.

(5) In the above embodiments, the application of the straight portions is first performed during the application of the sealant portion by the sealant application process. However, the application of the oblique portions may be performed first. Further, the application priorities among the straight portions or the application priorities among the oblique portions may be suitably altered.

(6) In the above embodiment 1, the application priorities between the reinforcing portion and the oblique portion may be arbitrarily determined.

(7) In the above embodiments, the sealant portions are applied to the CF substrates' parent material. However, sealant portions may be applied to the array substrates' parent material. In this case, the above embodiments 2 and 3 should be modified so that reinforcing portions are applied to the CF substrates' parent material.

(8) In the above embodiment 1, the linear reinforcing portions are provided to be connected to the sealant portion. However, the present invention can include a construction in which linear reinforcing portions are provided to be separated from the sealant portion.

(9) In the applicator of the above embodiment 2, the inclined guides are arranged so that the whole lengths thereof are within the length of the guide body. However, the present invention can include a construction in which the inclined guides are partly arranged within the length of the guide body so as to partly project to the lateral side of the guide body. Further, the present invention can include a construction that includes a single inclined guide or three or more inclined guides.

(10) In the above embodiment 3, the applicator includes a single inclined guide. However, the present invention can include a construction that includes two inclined guides connected to the respective ends of the guide body.

(11) In the above embodiments, the sealant portions and/or the reinforcing portions are applied to the parent material for a plurality of liquid crystal panels. However, the present invention can include a construction in which a sealant portion and/or reinforcing portions are applied to a separate substrate that can be cut out from a parent material, for example. Further, the present invention can include a construction, in which a parent material is divided into smaller parent materials by primary cutting, and sealant portions and/or reinforcing portions are applied to each smaller parent material for a plurality of substrates. These procedures can be also applied to the application of the connecting portions shown in the embodiment 4.

(12) In the above embodiments, an ultraviolet curable material is used for the sealant portions and the reinforcing portions. However, the present invention can include a construction in which another light curable resin material to be hardened by the irradiation of light of a wavelength other than ultraviolet wavelengths or another light/heat dual-curable resin material to be hardened by the irradiation of light of a wavelength other than ultraviolet wavelengths and by the application of heat is used instead. These materials can be also used for application of the connecting portions shown in the embodiment 4.

(13). In the above embodiments, the manufacture of a liquid crystal panel by use of "a one-drop-fill method" is shown, in which a liquid crystal material is dropped on one of the two substrates and thereafter the substrates are attached to each other. However, "a vacuum injection method" may be used instead. That is, after the substrates are attached to each other, a liquid crystal material may be injected between the substrates by vacuum injection.

(14) In the above embodiments, the liquid crystal panel has a rectangular shape (or specifically, an oblong rectangular shape). However, the liquid crystal panel may have any other quadrangular shape. For example, it may have a square shape.

(15) In the above embodiments, the TFTs are used as switching elements. However, the present invention can include a construction that uses another type of switching elements than TFTs.

(16) In the above embodiments, the cold cathode tubes are shown as the light sources of the backlight. However, the present invention can include a construction that uses another type of linear light sources than cold cathode tubes (such as hot cathode tubes), and also include a construction that uses LEDs.

(17) In the above embodiments, a television receiver as a device having a tuner is shown for illustrative purposes. However, the present invention can be applied to a display device that does not have a tuner.

The invention claimed is:

1. A manufacturing method of a liquid crystal panel, comprising:
applying a sealant portion to one of a pair of substantially rectangular substrates by a sealant portion application process, said sealant portion having a substantially frame-like shape and including an oblique portion at each of four corners thereof, said oblique portion being arranged oblique to a side of the substrate;
applying a reinforcing portion to one of said pair of substrates by a reinforcing portion application process, said reinforcing portion being arranged along a planar direction of said substrate so as to be located between said oblique portion and a corner point of said substrate;
dropping a liquid crystal material on said substrate having said sealant portion applied thereon, by a liquid crystal dropping process;
attaching said pair of substrates to each other, and fixing said sealant portion and said reinforcing portion to said pair of substrates, by an attachment process;
wherein application of said reinforcing portion by said reinforcing portion application process is performed for another one of said pair of substrates, than said substrate to be subjected to application of said sealant portion;
forming wiring components by a wiring process on said substrate to be subjected to application of said reinforcing portion, said wiring components including a wiring component to be connected to switching elements connected to pixel electrodes and further including a wiring component to be connected to a counter electrode provided on another one of said substrates, said wiring components including a conductive pad to be connected to said counter electrode;
applying a connecting portion formed of a conductive resin material to said conductive pad by a connecting portion application process;
wherein said reinforcing portion is formed of a same conductive resin material to be used for said connecting portion, and application of said reinforcing portion by said reinforcing portion application process is performed using a same applicator to be used by said connecting portion application process for application of said connecting portion.

2. An applicator to be used for application of a sealant portion to one of a pair of substantially rectangular substrates, said sealant portion having a substantially frame-like shape and including an oblique portion at each of four corners thereof, said oblique portion being arranged oblique to a side of said substrate, said applicator comprising:
a nozzle capable of ejecting a sealant material onto said substrate;
a dispenser body arranged to support said nozzle to be movable in a direction approaching to and receding from said substrate;
a guide arranged to support said dispenser body to be linearly slidable along a planar direction of said substrate;
a stage provided as a rest for said substrate, said stage being rotatable in a planar direction of said substrate and being movable in a direction perpendicular to a sliding direction of said dispenser body on said guide;
wherein said guide includes a guide body having a linear shape, and an inclined guide arranged oblique to the guide body;
wherein inclination of said inclined guide from said guide body is set to conform to inclination of said oblique portion from the side of said substrate; and
wherein said inclined guide is provided as a part separated from said guide body; and said inclined guide is located so that at least a part thereof is arranged within a length of said guide body.

3. An applicator to be used for application of a sealant portion to one of a pair of substantially rectangular substrates, said sealant portion having a substantially frame-like shape and including an oblique portion at each of four corners thereof, said oblique portion being arranged oblique to a side of said substrate, said applicator comprising:
a nozzle capable of ejecting a sealant material onto said substrate;
a dispenser body arranged to support said nozzle to be movable in a direction approaching to and receding from said substrate;
a guide arranged to support said dispenser body to be linearly slidable along a planar direction of said substrate;
a stage provided as a rest for said substrate, said stage being rotatable in a planar direction of said substrate and being movable in a direction perpendicular to a sliding direction of said dispenser body on said guide;
wherein said guide includes a guide body having a linear shape, and an inclined guide arranged oblique to the guide body;
wherein inclination of said inclined guide from said guide body is set to conform to inclination of said oblique portion from the side of said substrate; and
wherein said inclined guide and said guide body are connected to each other; and said dispenser body is movable between said inclined guide and said guide body.

* * * * *